United States Patent
Abedini et al.

(10) Patent No.: US 11,700,045 B2
(45) Date of Patent: Jul. 11, 2023

(54) SYSTEM AND METHOD FOR BEAM TRAINING WITH RELAY LINKS

(71) Applicant: QUALCOMM Incorporated, San Diego, CA (US)

(72) Inventors: Navid Abedini, Somerset, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/999,571

(22) Filed: Aug. 21, 2020

(65) Prior Publication Data

US 2021/0126694 A1    Apr. 29, 2021

Related U.S. Application Data

(60) Provisional application No. 62/927,655, filed on Oct. 29, 2019.

(51) Int. Cl.
*H04B 7/06*    (2006.01)
*H04B 7/0408*    (2017.01)
(Continued)

(52) U.S. Cl.
CPC ......... *H04B 7/0695* (2013.01); *H04B 7/0408* (2013.01); *H04L 5/005* (2013.01);
(Continued)

(58) Field of Classification Search
CPC .... H04B 7/0695; H04B 7/026; H04B 7/0408; H04B 7/088; H04B 7/15542;
(Continued)

(56) References Cited

U.S. PATENT DOCUMENTS

2017/0195033 A1\* 7/2017 Zhang ................. H04W 72/046
2018/0220398 A1   8/2018 John Wilson et al.
(Continued)

OTHER PUBLICATIONS

International Search Report and Written Opinion—PCT/US2020/047653—ISA/EPO—dated Nov. 4, 2011.
(Continued)

*Primary Examiner* — Derrick V Rose
(74) *Attorney, Agent, or Firm* — Procopio, Cory, Hargreaves & Savitch LLP

(57) ABSTRACT

Apparatus, methods, and computer-readable media for facilitating beam training with relay link are disclosed herein. An example method for wireless communication at a control node includes determining a first set of measurements associated with at least one set of beam pairs. In some examples, the at least one set of beam pairs is associated with a wireless backhaul link between a first wireless device and a relay device, a first relay access link portion between the first wireless device and the relay device, or a second relay access link portion between the relay device and at least one second wireless device. The example method also includes configuring at least one subset of beam pairs of the at least one set of beam pairs based on the first set of measurements. Additionally, the example method includes transmitting information indicating the at least one subset of beam pairs to the relay device.

30 Claims, 12 Drawing Sheets

(51) Int. Cl.
  *H04W 24/10* (2009.01)
  *H04L 5/00* (2006.01)
  *H04W 88/14* (2009.01)

(52) U.S. Cl.
  CPC .......... *H04L 5/0082* (2013.01); *H04L 5/0092* (2013.01); *H04W 24/10* (2013.01); *H04W 88/14* (2013.01)

(58) Field of Classification Search
  CPC ..... H04B 7/0639; H04L 5/005; H04L 5/0082; H04L 5/0092; H04L 5/001; H04L 5/0048; H04L 5/0051; H04L 5/0055; H04W 24/10; H04W 88/14; H04W 88/085
  See application file for complete search history.

(56) References Cited

U.S. PATENT DOCUMENTS

| | | | | |
|---|---|---|---|---|
| 2019/0132110 A1* | 5/2019 | Zhou | .................... | H04L 5/0094 |
| 2019/0261425 A1 | 8/2019 | Park et al. | | |
| 2020/0351790 A1* | 11/2020 | Hsieh | ................ | H04W 52/0245 |
| 2020/0389805 A1* | 12/2020 | Kim | ...................... | H04B 17/345 |
| 2021/0266128 A1* | 8/2021 | Zhang | .................. | H04L 27/261 |
| 2021/0281314 A1* | 9/2021 | Zander | ................ | H04B 7/0695 |

OTHER PUBLICATIONS

LG Electronics: "Discussions on NR IAB Support", 3GPP TSG RAN WG1 Meeting #94; R1-1808511, Discussions on NR IAB Support, 3rd Generation Partnership Project (3GPP), Mobile Competence Centre 650, Route Des Lucioles; F-06921, Sophia-Antipolis Cedex; France, vol. RAN WG1 No, Gothenburg, Sweden, Aug. 20-24, 2018, Aug. 11, 2018, 8 Pages, XP051515889, Retrieved from the Internet: URL: https://www.3gpp.org/ftp/tsg_ran/wg1_rL1/TSGR1_94/Docs/R1-1808511.zip, [retrieved Aug. 11, 2018], Sect. 4. Discovery among NR IAB nodes, figs. 3.1 and 3.2.

* cited by examiner

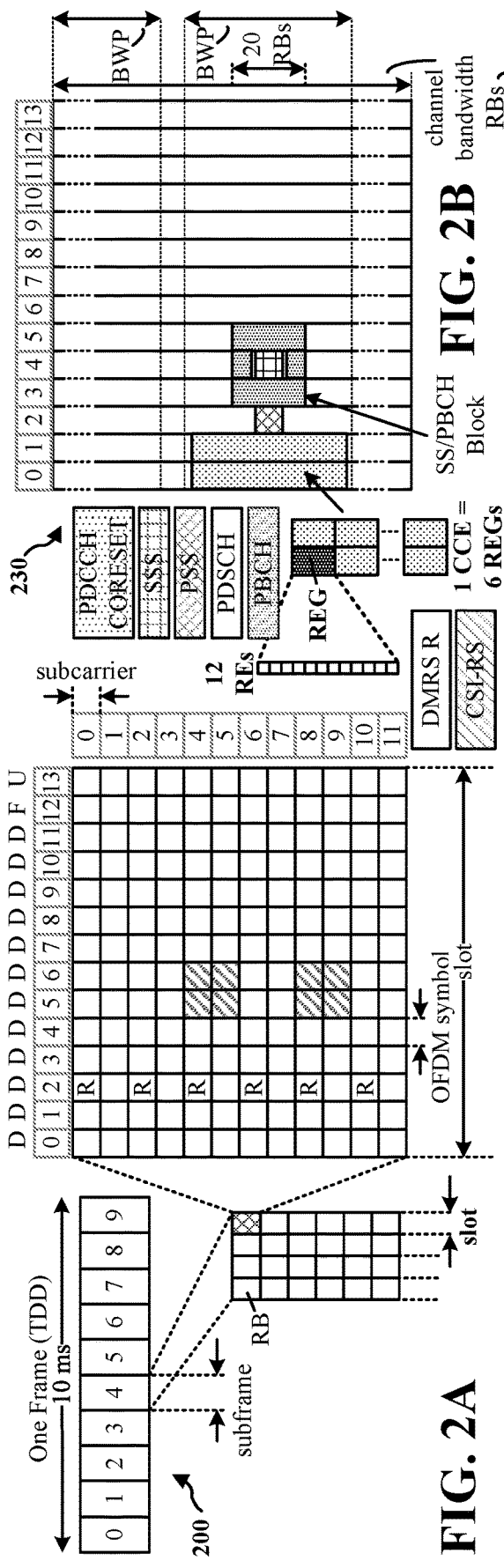
FIG. 2A
FIG. 2B
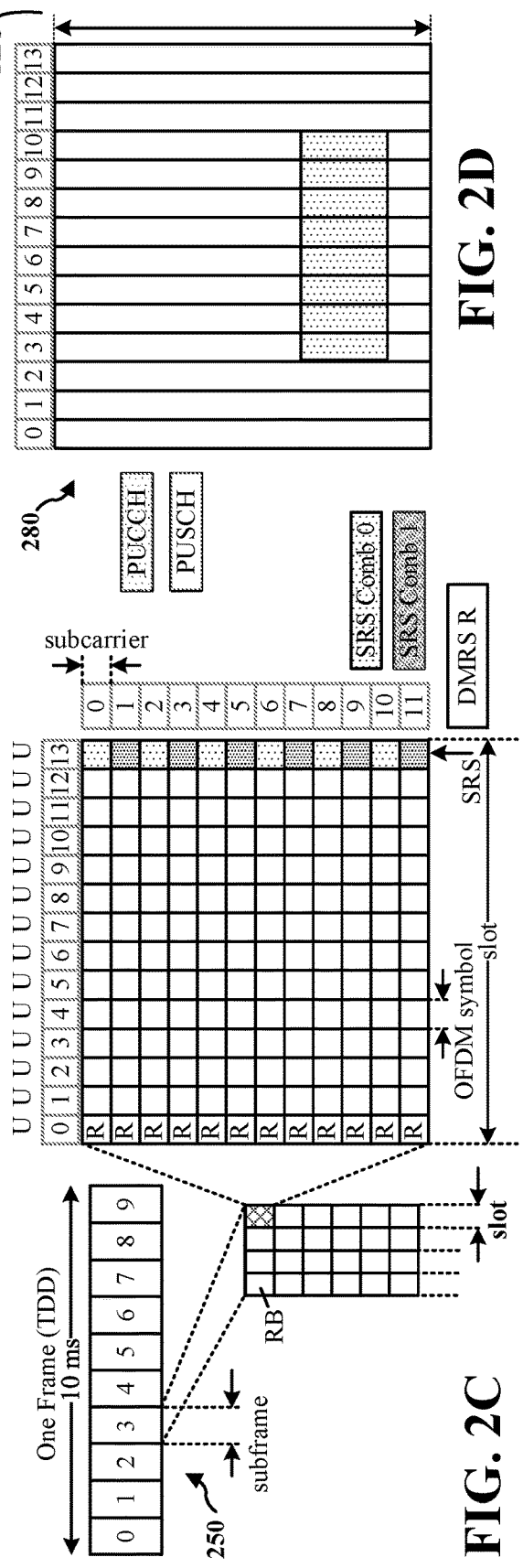
FIG. 2C
FIG. 2D

SYSTEM AND METHOD FOR BEAM TRAINING WITH RELAY LINKS

CROSS REFERENCE TO RELATED APPLICATION(S)

This application claims the benefit of U.S. Provisional Patent Application Ser. No. 62/927,655, entitled "System and Method for Beam Training with Relay Links," and filed on Oct. 29, 2019, which is expressly incorporated by reference herein in its entirety.

BACKGROUND

Technical Field

The present disclosure relates generally to communication systems, and more particularly, to management of beams by a base station for communication through a relay device.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various wireless communications systems, a relay device may be configured to relay data and/or control information between a base station and a user equipment (UE) on an access link. Further, the relay device may be configured to communicate control information with the base station on a backhaul link. As both the backhaul link and the access link may be wireless, a control interface on the backhaul link may share at least a portion of time and/or frequency resources with the access link. For example, both the access link and the control interface on the backhaul link may be configured in a millimeter wave (mmW) mmW/near-mmW band, such as Frequency Range 2 (FR2) in a 5G NR network.

While both the backhaul link and the access link may be configured in a mmW/near-mmW band, a beam configured for communication between the base station and the relay device for the backhaul link may be unsuitable for communication between the base station and the relay device on the access link (e.g., due to frequency selectivity). For example, one beam pair link may be configured for control signaling on the backhaul link, but the configured beam pair link may be in a deep fade in portions of the spectrum on which the relay signaling is carried, thereby preventing successful reception and/or acknowledgement of some or all of the relay signaling.

Moreover, the wireless communications environment in which the base station communicates with the UE through the relay device may change over time, which may affect the quality of the beam pair links via which the base station and the relay device communicate on the backhaul link and the access link and via which the relay device and the UE communicate on the access link. In addition, uplink communication to the base station may be asymmetrical with respect to downlink communication from the base station and, therefore, respective beam pair links may be separately configured for uplink and downlink communication between the base station and the relay device for both the backhaul link and the access link, as well as for uplink and downlink communication for the base station between the relay device and the UE on the access link.

In view of the foregoing, beam management may be implemented in order to identify and select beam pair links providing satisfactory quality for communication in a wireless communications environment. According to the present disclosure, a control node may perform beam management (e.g., including beam training) by configuring each of the beam pair links via which a first wireless device communicates with a relay device on a backhaul link, via which the first wireless device communicates with a relay device on an access link, and/or via which the first wireless device communicates with a second wireless device through the relay device on the access link. Thus, the present disclosure may provide various techniques and approaches to configuration of beam pair links that are suitable for at least one of uplink and/or downlink communication on both a backhaul link and an access link, e.g., when a first wireless device communicates with a second wireless device through a relay device. In some examples, the control node may be a base station. In some examples, the first wireless device and/or the second wireless device may be a base station, a UE, and/or another relay device.

In an aspect of the disclosure, a method, a computer-readable medium, and an apparatus are provided. The apparatus may be a control node. The example apparatus determines a first set of measurements associated with at least one set of beam pairs. In some examples, the at least one set of beam pairs may be associated with at least one of a wireless backhaul link between a first wireless device and a relay device, a first relay access link portion between the first wireless device and the relay device, or a second relay access link portion between the relay device and at least one second wireless device. The example apparatus also configures at least one subset of beam pairs of the at least one set of beam pairs based on the first set of measurements. Additionally, the example apparatus transmits information indicating the at least one subset of beam pairs to the relay device.

In another aspect of the disclosure, a method, a computer-readable medium, and an apparatus are provided. The apparatus may be a relay device. An example apparatus receives, from a first wireless device, information indicating a subset of a set of beam pairs based on a first set of measurements associated with the set of beam pairs. In some examples, the subset of beam pairs may be associated with at least one of a wireless backhaul link between the first wireless device and the relay device, a first relay access link portion between the first wireless device and the relay device, or a second relay access link portion between the relay device and at least one second wireless device. The example apparatus also receives first control information on a wireless backhaul link from the control node. Additionally, the example apparatus relays at least one of data or second control information between the first wireless device on the first relay access link portion and the at least one second wireless device on the second relay access link portion. In some examples, at least one of the receiving of the first control information or the relaying of the at least one of data or second control information may be based on the subset of beam pairs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
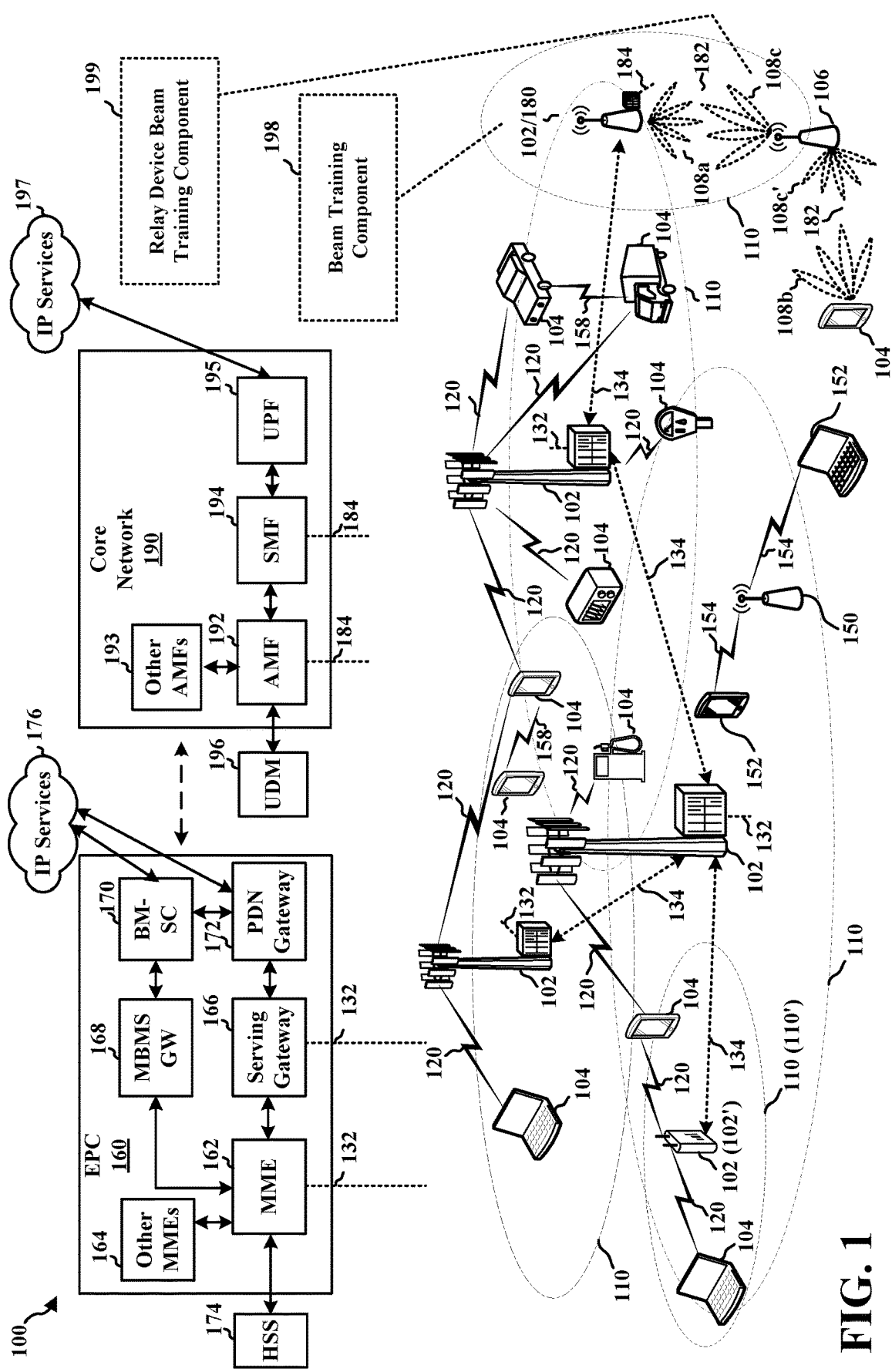
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6

GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the access network 100 may include at least one relay device 106, as described herein. A relay device 106 may be configured to forward relay signaling (e.g., data and/or control information) between a first wireless device and a second wireless device over an access link. Further, the relay device 106 may be configured to communicate control signaling (e.g., control information associated with the relay device 106 that is not forwarded between the first wireless device and the second wireless device). In some examples, the first wireless device may be implemented by the base station 102/180. In some examples, the second wireless device may be implemented by the UE 104.

As the base station 102/180 and the relay device 106 may lack a wired connection for backhaul communications, the base station 102/180 may utilize beamforming 182 with the relay device 106 for both a wireless backhaul link between the base station 102/180 and the relay device 106 and a wireless access link between the base station 102/180 and the UE 104 through the relay device 106.

The base station 102/180 may transmit beamformed signals to the relay device 106 in one or more transmit directions 108a. The relay device 106 may receive the beamformed signal from the base station 102/180 in one or more receive directions 108c. The relay device 106 may also transmit beamformed signals to the base station 102/180 in one or more transmit directions. The base station 102/180 may receive the beamformed signals from the relay device 106 in one or more receive directions. Similarly, the relay device 106 may transmit beamformed signals to the UE 104 in one or more transmit directions 108c'. The UE 104 may receive the beamformed signals from the relay device 106 in one or more receive directions 108b. The UE 104 may also transmit beamformed signals to the relay device 106 in one or more transmit directions. The relay device 106 may receive the beamformed signals from the UE 104 in one or more receive directions.

The relay device 106 may perform beam training with the base station 102/180 and with the UE 104 to respectively determine the best receive and transmit directions with the base station 102/180 and with the UE 104. The transmit and receive directions for one or more of the base station 102/180, the relay device 106, and/or the UE 104 may or may not be the same.

According to various aspects, the base station 102/180 of FIG. includes a beam training component 198. The example beam training component 198 may be configured to determine a first set of measurements associated with at least one set of beam pairs. In some examples, at least one set of beam pairs may be associated with at least one of a wireless backhaul link between a first wireless device and a relay device, a first relay access link portion between the first wireless device and the relay device, or a second relay access link portion between the relay device and at least one second wireless device. The example beam training component 198 may also be configured to configure at least one subset of beam pairs of the at least one set of beam pairs based on the first set of measurements. Additionally, the example beam training component 198 may be configured to transmit information indicating the at least one subset of beam pairs to the relay device.

Correspondingly, the relay device 106 of FIG. 1 may include relay device beam training component 199 configured to receive, from a first wireless device, information indicating a subset of a set of beam pairs based on a first set of measurements associated with the set of beam pairs. In some examples, the subset of beam pairs may be associated with at least one of a wireless backhaul link between the first wireless device and the relay device, a first relay access link portion between the first wireless device and the relay device, or a second relay access link portion between the relay device and at least one second wireless device. The example relay device beam training component 199 may also be configured to receive first control information on a wireless backhaul link from the control node. Additionally, the example relay device beam training component 199 may be configured to relay at least one of data or second control information between the first wireless device on the first relay access link portion and the at least one second wireless device on the second relay access link portion. In some examples, at least one of the receiving of the first control information or the relaying of the at least one of data or second control information may be based on the subset of beam pairs.

Although the following description provides examples directed to 5G NR, the concepts described herein may be applicable to other similar areas, such as LTE, LTE-A, CDMA, GSM, and other wireless/radio access technologies utilizing communications through a relay device.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
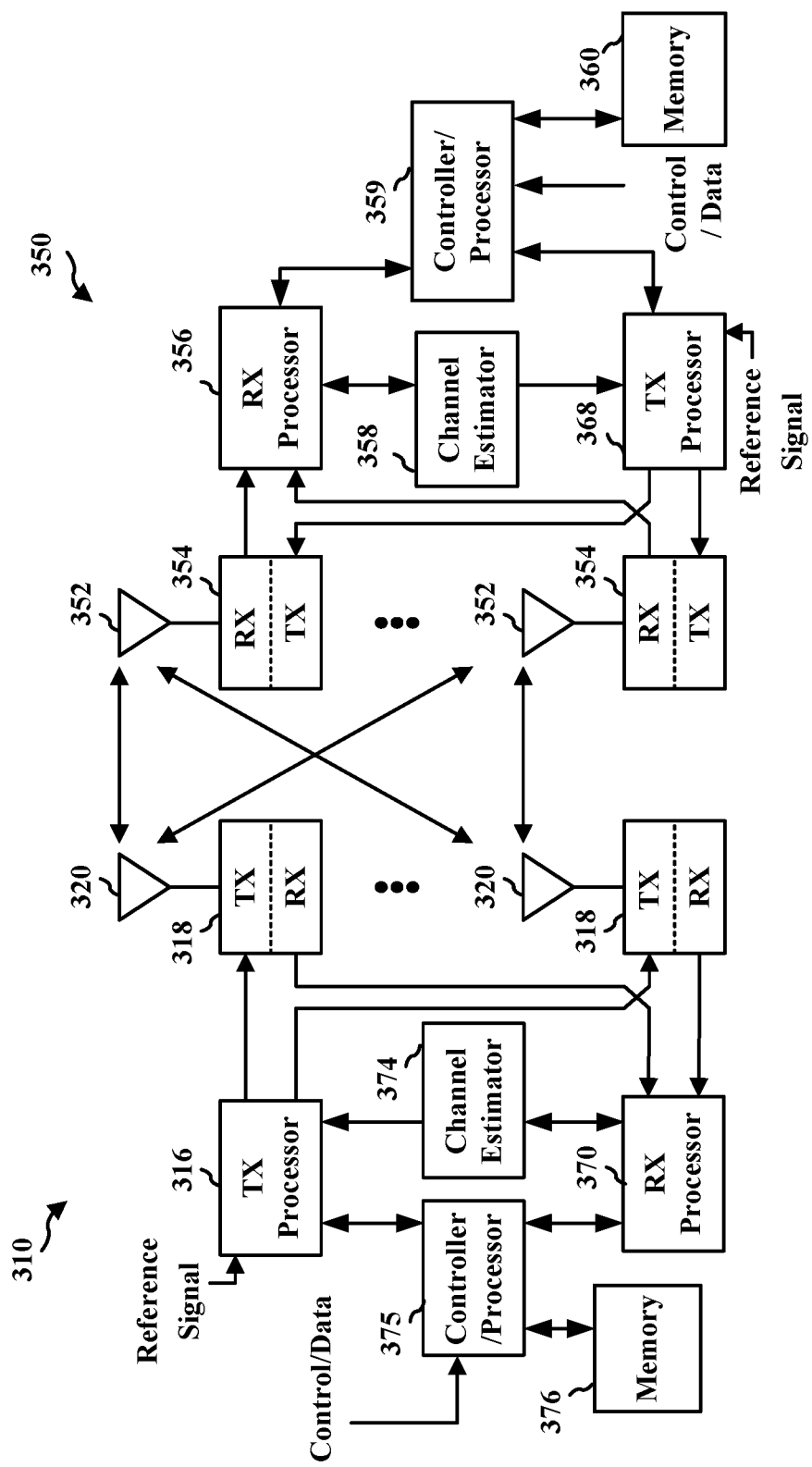
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the beam training component 198 of FIG. 1.

At least one of the TX processor 368, the RX processor 356, and the controller/processor 359 may be configured to perform aspects in connection with the relay device beam training component 199 of FIG. 1.

Figure 4:
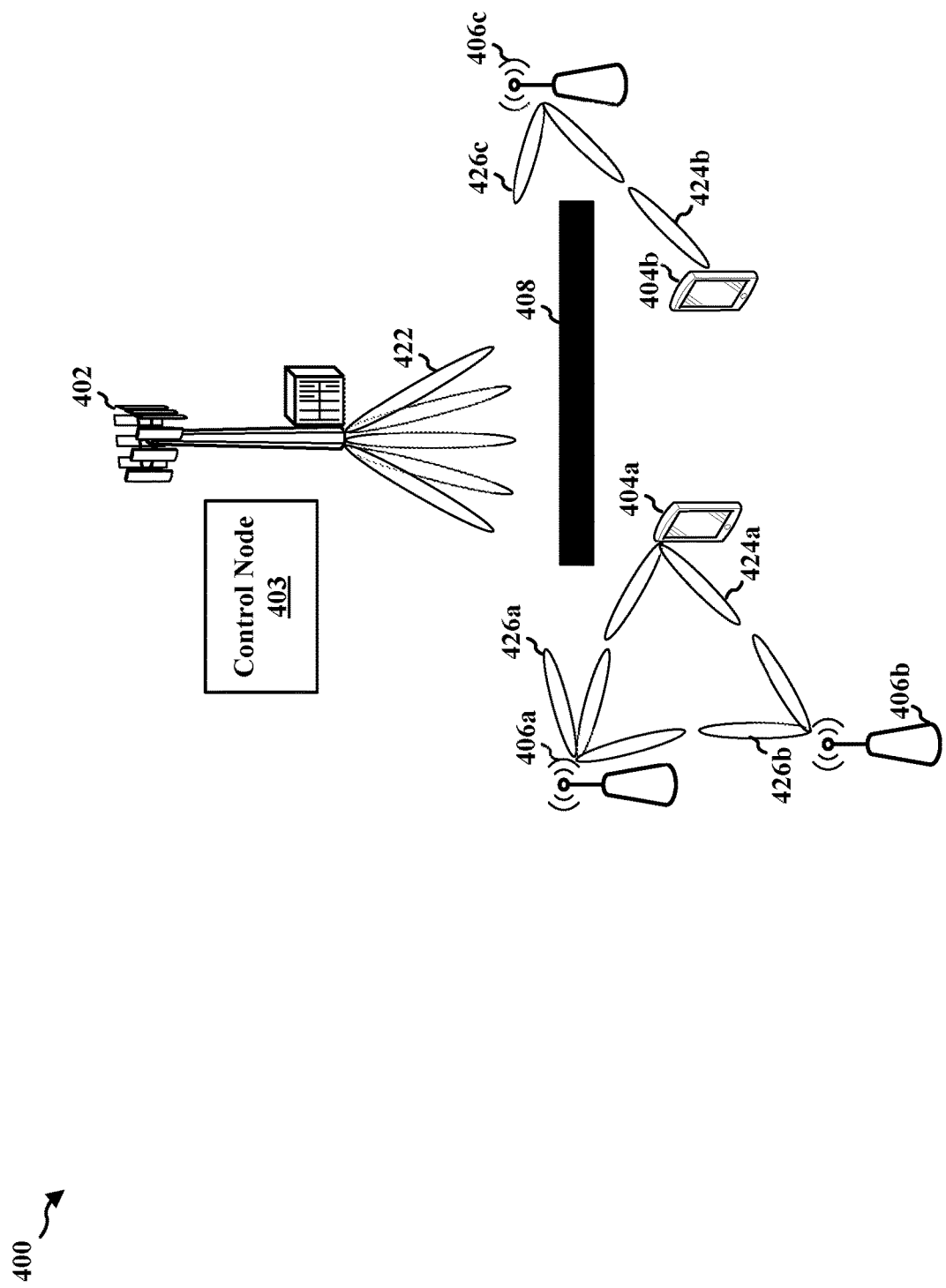
FIG. 4 is a diagram illustrating an example of a base station communicating with a set of UEs through a set of relay devices, in accordance with various aspects of the present disclosure.

FIG. 4 is a diagram illustrating a wireless communications environment 400. The wireless communications environment 400 may include, inter alia, a base station 402, a set of relay devices 406a, 406b, 406c, and a set of UEs 404a, 404b. In the context of FIGS. 1 and 3, the base station 402 may be implemented by the base station 102/180 and/or the base station 310, each of the UEs 404a, 404b may be implemented by the UE 104 and/or the UE 350, and each of the relay devices 406a, 406b, 406c may be implemented by the relay device 106.

Each of the UEs 404a, 404b and each of the relay devices 406a, 406b, 406c may be configured to communicate with the base station 402 in a mmW and/or near-mmW RAN (e.g., a 5G NR RAN). Thus, the base station 402, the UEs 404a, 404b, and the relay devices 406a, 406b, 406c may utilize beamforming in order communicate. For beamformed communication, a beam pair link may be configured, e.g., by the base station 402. A beam pair link may include at least one TX beam configured at a transmitting side and at least one corresponding RX beam configured at a receiving side. Thus, it may be appreciated that signals may be transmitted by the transmitting side via the at least one TX beam and received by the receiving side via the at least one RX beam.

For example, at least one of the beams 426a, 426b, 426c of a respective one of the relay devices 406a, 406b, 406c and a corresponding at least one of the beams 422 of the base station 402 may be configured as a beam pair link, which may be configured for one or both of uplink communication and/or downlink communication. Similarly, at least one of the beams 424a, 424b of a respective one of the UEs 404a, 404b and a corresponding at least one of the beams 426a, 426b, 426c of a respective one of the relay devices 406a, 406b, 406c may be configured as a beam pair link, which may be configured for one or both of uplink communication and/or downlink communication to be forwarded to and/or from the base station 402.

However, the paths between each of the UEs 404a, 404b and the base station 402 may be obstructed by at least one blocker 408 (e.g., a human body, a wall, another structure through which high-frequency signals may not pass, etc.), which may prevent signals from traveling between the UEs 404a, 404b and the base station 402 as signals in the relatively high frequencies of mmW and near-mmW RANs may be unable to propagate through the at least one blocker 408.

The wireless communications environment 400 may include a set of relay devices 406a, 406b, 406c, each of which may be configured to relay signals between the UEs 404a, 404b and the base station 402 with the base station 402 acting as a donor node. That is, at least one of the relay devices 406a, 406b, 406c may provide a path to each of the UEs 404a, 404b for communication with the base station 402, for example, in order to avoid the at least one blocker 408 occluding the paths between the UEs 404a, 404b and the base station 402 and/or to extend the range of the base station 402 when the UEs 404a, 404b are out of the coverage area of the base station 402.

In some aspects, each of the relay devices 406a, 406b, 406c may be an Internet Access and Backhaul (IAB) node, which may be implemented in some RANs adhering to Third Generation Partnership Project (3GPP) standards. IAB node structure may support various architectures, including L1, L2, and/or L3 solutions. When implemented as an L3 solution, an IAB node may implement at least a portion of three layers of the radio protocol stack for relaying access links to UEs, including the PHY layer (e.g., of L1), the MAC, RLC, PDCP, and SDAP layers (e.g., of L2), and the RRC layer (e.g., of L3). When implemented as an L2 solution, an IAB node may implement at least a portion of two layers of the radio protocol stack for relaying access links to UEs, including the PHY layer (e.g., of L1), and the MAC, RLC, PDCP, and/or SDAP layers (e.g., of L2). When implemented as an L1 solution, an IAB node may implement only the PHY layer (e.g., of L1) for relaying access links to UEs.

Each of the relay devices 406a, 406b, 406c may be implemented as an L1 solution, which may be relatively simple, inexpensive, and/or low power. As an L1 relay device, each of the relay devices 406a, 406b, 406c may relay analog signals between the base station 402 and at least one of the UEs 404a, 404b on an access link. That is, each of the relay devices 406a, 406b, 406c may refrain from decoding and other processing commensurate with conversion of analog signals to digital signals and, instead, may forward an analog signal received on a RX antenna to at least one of the UEs 404a, 404b from the base station 402 (or vice versa) at a TX antenna. Each of the relay devices 406a, 406b, 406c may amplify the power of an analog signal, received at a respective RX antenna, for transmission at a respective TX antenna. Thus, in mmW/near-mmW networks, beamforming may be configured between the base station 402 and each of the relay devices 406a, 406b, 406c, as well as between each of the relay devices 406a, 406b, 406c and at least one of the UEs 404a, 404b, in association with transmission and reception on the access link at respective TX and RX antennas. For example, the base station 402 may configure beamforming for each of the UEs 404a, 404b and each of the relay devices 406a, 406b, 406c, such as during a beam management procedure and/or beam training procedure.

IAB nodes may incur relatively low overheads in terms of cost, complexity, and/or power consumption, particularly when implemented as L1 solutions. Such relatively low overheads may allow many IAB nodes to be deployed, particularly when implemented as L1 solutions. Deployment of many IAB nodes (e.g., including the relay devices 406a, 406b, 406c) may be possible, but connecting each of the many IAB nodes to a core network through the base station 402 using wired backhaul may be infeasible. Accordingly, IAB nodes may be configured for wireless backhaul, potentially with multiple hops between the base station 402 and some IAB nodes (e.g., including the second relay device 406b).

With wireless backhaul, each of the relay devices 406a, 406b, 406c may be wirelessly connected with the core network through the base station 402. However, wireless backhaul links may be carried on the same resources as the wireless access links between the base station 402 and each of the UEs 404a, 404b. For example, wireless backhaul links between the base station 402 and each of the relay devices 406a, 406b, 406c may share the same RAT (e.g., 5G NR RAT) and the same frequency band as the wireless access links between the base station 402 and each of the UEs 404a, 404b.

As with the access link, beamforming may be configured between the base station 402 and each of the relay devices 406a, 406b, 406c in association with transmission and reception at respective TX and RX antennas on a backhaul link in mmW/near-mmW networks. For example, the base station 402 may configure beamforming for each of the relay devices 406a, 406b, 406c, such as during a beam management procedure and/or beam training procedure. Beamforming configurations associated with communication on the backhaul link may be the same or different from beamforming configurations associated with communication on the access link.

Although the example of FIG. 4 provides examples in which the base station 402 facilitates communication on the backhaul link and the access link, the concepts described herein may be applicable to other examples in which a control node 403 (sometimes referred to as a "control interface") facilitates communication on the backhaul link and the base station 402 facilitates communication on the access link. For example, the control node 403 may facilitate configuring beamforming for communicating control information via the backhaul link and the base station 402 may facilitate configuring beamforming for communicating data via the access link. In some examples, the base station 402 may comprise the control node 403. In some examples, the control node 403 may be a separate node from the base station 402.

Figure 5:
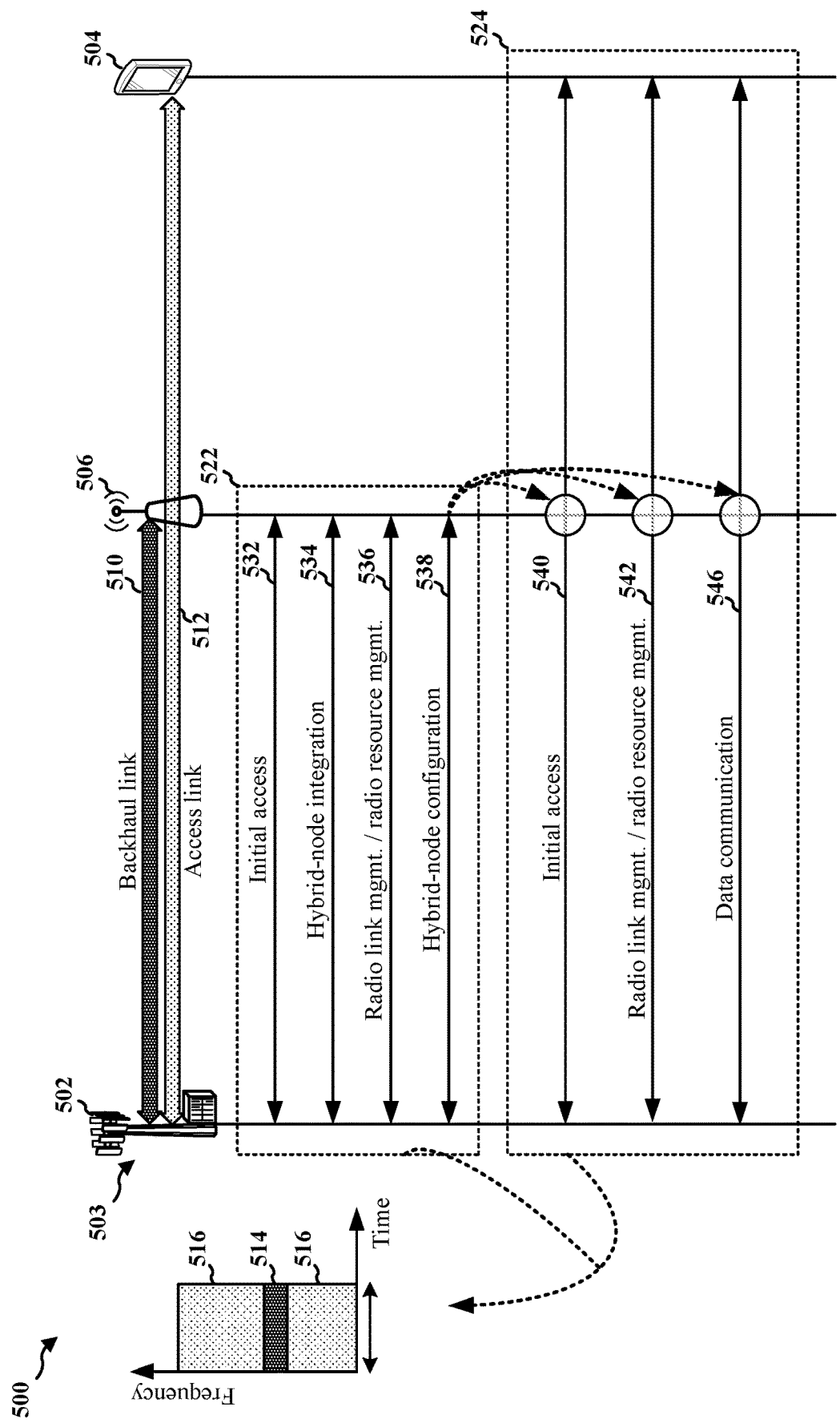
FIG. 5 is a call flow diagram illustrating an example of a wireless communications system in which a relay device communicates with a base station on a wireless backhaul link and relays signaling between the base station and a UE on a wireless access link, in accordance with various aspects of the present disclosure.

FIG. 5 is a diagram illustrating a call flow in a wireless communications environment 500. The wireless communications environment 500 may include, inter alia, a base station 502, a UE 504, and a relay device 506. In the context of FIGS. 1, 3, and 4, the base station 502 may be implemented by the base station 102/180, the base station 310, and/or the base station 402, the UE 504 may be implemented by the UE 104, the UE 350, and/or one of the UEs 404a, 404b, and the relay device 506 may be implemented by the relay device 106 and/or one of the relay devices 406a, 406b, 406c.

The relay device 506 may be configured to communicate with the base station 502 on a backhaul link 510, which may be wireless. For establishment of the backhaul link 510, the relay device 506 may be configured to perform a set of backhaul-related procedures 522. First, the relay device 506 may perform an initial access procedure 532 with the base station 502. The initial access procedure 532 may include, for example, a search for synchronization signals transmitted by the base station 502 and a random access channel (RACH) procedure. In the initial access procedure 532, the relay device 506 may send a random access preamble to the base station 502 and receive a random access response from the base station 502, e.g., for a RACH procedure.

Next, the relay device 506 may perform a hybrid-node integration procedure 534 with the base station 502. For the hybrid-node integration procedure 534, the relay device 506 may provide first information indicating that the relay device 506 is operating as a relay, as well as second information indicating capabilities and configuration of the relay device 506. Such information may include, inter alia, a set of beams supported by the relay device 506 and/or power configuration(s) supported by the relay device 506.

Additionally, the relay device 506 may perform at least one radio link management ("radio link mgmt.") and/or radio resource management ("radio resource mgmt.") procedure 536 with the base station 502. In the radio link management and/or radio resource management procedure 536, the base station 502 may configure one or more beams for communication between the relay device 506 and the base station 502, as well as configure a set of resources for communication between the relay device 506 and the base station 502 (e.g., resources for the backhaul link 510).

Further, the relay device 506 may perform a hybrid-node configuration procedure 538 with the base station 502. In the hybrid-node configuration procedure 538, the base station 502 may configure the relay device 506 with one or more parameters for relay operations, e.g., in which the relay device 506 relays signals between the base station 502 and the UE 504. For example, the base station 502 may configure the relay device 506 with various parameters associated with initial access by the UE 504, radio link management and/or radio resource management associated with relay operations for the UE 504, a set of beams to use for relay operations, and/or a set of power levels to use for relay operations.

In some aspects of the hybrid-node configuration procedure 538, the base station 502 may configure, for the relay device 506, one or more of beamforming, power, transmission/reception switching, relay deployment, and/or associated scheduling. For example, the base station 502 may perform a beam management procedure (e.g., including beam training and/or beam refinement) with the relay device 506. Based on the beam management procedure implemented by the base station 502, the base station 502 may transmit a beamforming configuration to the relay device 506 that indicates one or more beams the relay device 506 is to use for transmission and/or reception on the backhaul link 510 and/or indicates one or more beams the relay device 506 is to use for relaying signals between the base station 502 and the UE 504. The base station 502 may further transmit a power configuration to the relay device 506 that indicates an amount of power the relay device 506 is to use for relaying signals between the base station 502 and the UE 504 and/or indicates an amount that signals received from one of the base station 502 or the UE 504 are to be amplified before relaying those signals to the other of the base station 502 or the UE 504.

Still with reference to the hybrid-node configuration procedure 538, the base station 502 may transmit a transmission/reception switching configuration to the relay device 506 that indicates a direction in which the relay device 506 is to relay signals between the base station 502 and the UE 504. In some examples, a transmission/reception switching configuration may indicate to the relay device 506 whether one or both of uplink signaling from the UE 504 and/or downlink signaling from the base station 502 are to be respectively relayed to the base station 502 or to the UE 504. Further, the base station 502 may transmit a relay deployment configuration to the relay device 506 that indicates a time and/or duration for which the relay device 506 may refrain from relaying signals between the base station 502 and the UE 504. In some examples, a relay deployment configuration may indicate that the relay device 506 may switch off an analog radio frequency (RF) deployment so that the relay device 506 does not unnecessarily relay signals.

In connection with one or more of the configurations for beamforming, power, transmission/reception switching, and/or relay deployment, the base station 502 may transmit associated scheduling information to the relay device 506. Scheduling information may indicate a time and/or duration for which an associated configuration is to be applied for at least one of beamforming, power, transmission/reception switching, and/or relay deployment. For example, scheduling information configured by the base station 502 for the relay device 506 may indicate a time at which to change beamforming configurations or to change power configurations. In some aspects, the base station 502 may indicate a time and/or duration of scheduling information as one or more time resources, such as a symbol, slot, and/or subframe at which an associated one of the aforementioned configurations is to be applied.

Once configured to provide relay support for the base station 502, the relay device 506 may relay signals between the base station 502 and the UE 504 on an access link 512 for a set of access link-related procedures 524. For each of the access link-related procedures 524, the relay device 506 may refrain from processing and decoding the signals relayed between the base station 502 and the UE 504 on the access link 512. Instead, the relay device 506 may relay analog signals between the base station 502 and the UE 504.

Over the access link 512, the UE 504 may be configured to communicate in a mmW and/or near-mmW RAN (e.g., a 5G NR RAN) and, therefore, may utilize beamforming. However, the UE 504 may be out of a coverage area provided by the base station 502 and/or path(s) between the UE 504 and the base station 502 may be occluded such that beamformed communication between the base station 502 and the UE 504 is impractical (see, e.g., FIG. 4, supra). Thus, the access link 512 may traverse the relay device 506, such as to extend coverage of the base station 502 to the UE 504 and/or to provide an alternative communications path between the base station 502 and the UE 504, thereby allowing the UE 504 to benefit from mmW/near-mmW communication.

In some aspects, the UE 504 may be connected with the base station 502 without traversing the relay device 506 in another portion of the frequency spectrum. For example, the UE 504 may communicate with the base station 502 in a sub-6 or sub-7 GHz band, such as for LTE communication.

Through the relay device 506, the UE 504 may perform an initial access procedure 540 with the base station 502. The initial access procedure 540 may include, inter alia, a RACH procedure in which the UE 504 transmits a random access preamble to the base station 502 and the base station 502 transmits a random access response to the UE 504, both of which may be relayed by the relay device 506 (e.g., as analog signals).

In addition, a radio link management ("radio link mgmt.") and/or radio resource management ("radio resource mgmt.") procedure 542 may be performed between the base station 502 and the UE 504. For example, the base station 502 may configure a set of resources on which to communicate with the UE 504 on the access link 512.

Subsequently, the base station 502 and the UE 504 may perform data communication 546 on the access link 512. For example, the relay device 506 may relay downlink and/or uplink data between the base station 502 and the UE 504 for the access link 512. As aforementioned, the relay device 506 may relay the downlink and/or uplink data as analog signals. For example, the relay device 506 may refrain from decoding and/or from performing other processing that would otherwise convert the analog signals to digital.

While relaying signals between the base station 502 and the UE 504 for one or more of the access link-related procedures 524 (e.g., at least for the data communication 546), the base station 502 may contemporaneously configure (or reconfigure) the relay device 506. To do so, the base station 502 and the relay device 506 may communicate via a control interface 503 (or a control node, such as the example control node 403 of FIG. 4). The control interface 503 may support communication of control signaling between the base station 502 and the relay device 506, which may include support for communication of information associated with the control signaling, such as uplink information transmitted from the relay device 506 to the base station 502 upon which the base station 502 may base configuration of some control information for the relay device 506.

The control interface 503 may be, for example, configured on the backhaul link 510. In some aspects, the control interface 503 on the backhaul link 510 may be configured in-band with the access link 512. For example, the control interface 503 on the backhaul link 510 may be configured on a narrow bandwidth part (BWP) of the same carrier frequency on which the access link 512 is configured.

In some other aspects, the control interface 503 on the backhaul link 510 may be configured out-of-band with the access link 512. Illustratively, the control interface 503 may be configured on a RAT or other wireless technology that is different from that on which the access link 512 is configured. For example, the control interface 503 may be configured on Bluetooth or other short-range communications technology, whereas the access link 512 may be configured on 5G NR. Alternatively, the control interface 503 may be configured on a frequency band that is different from that on which the access link 512 is configured. For example, the control interface 503 may be configured on LTE Narrowband-IoT (NB-IoT), whereas the access link 512 may be configured on 5G NR.

As both the backhaul link 510 and the access link 512 may be wireless, the control interface 503 on the backhaul link 510 may share at least a portion of time and/or frequency resources with the access link 512. For example, both the access link 512 and the control interface 503 on the backhaul link 510 may be configured in a mmW/near-mmW band, such as Frequency Range 2 (FR2) in a 5G NR RAN.

While both the backhaul link 510 and the access link 512 may be configured in a mmW/near-mmW band, a beam configured for communication between the base station 502 and the relay device 506 for the backhaul link 510 may be unsuitable for communication between the base station 502 and the relay device 506 on the access link 512 (e.g., due to frequency selectivity). For example, one beam pair link may be configured for control signaling 514 on the backhaul link 510, but the configured beam pair link may be in a deep fade in portions of the spectrum on which the relay signaling 516 is carried, thereby preventing successful reception and/or acknowledgement of some or all of the relay signaling 516.

Moreover, the wireless communications environment 500 in which the base station 502 communicates with the UE 504 through the relay device 506 may change over time, which may affect the quality of the beam pair links via which the base station 502 and the relay device 506 communicate on the backhaul link 510 and the access link 512 and/or via which the relay device 506 and the UE 504 communicate on the access link 512. In addition, uplink communication to the base station 502 may be asymmetrical with respect to downlink communication from the base station 502 and, therefore, respective beam pair links may be separately configured for uplink and downlink communication between the base station 502 and the relay device 506 for both the backhaul link 510 and the access link 512, as well as for uplink and downlink communication for the base station 502 between the relay device 506 and the UE 504 on the access link 512.

In view of the foregoing, beam management may be implemented in order to identify and select beam pair links providing satisfactory quality for communication in a wireless communications environment. According to the present disclosure, a base station may perform beam management (e.g., including beam training) by configuring each of the beam pair links via which the base station communicates with a relay device on a backhaul link, via which the base station communicates with a relay device on an access link, and/or via which the base station communicates with a UE through the relay device on the access link. In some examples, communications between the base station and the relay device on the backhaul link may be facilitated by a control interface (or a control node). Thus, the present disclosure may provide various techniques and approaches to facilitate configuration of beam pair links that are suitable for at least one of uplink and/or downlink communication on both a backhaul link and an access link, e.g., when a base station communicates with a UE through a relay device.

Figure 6:
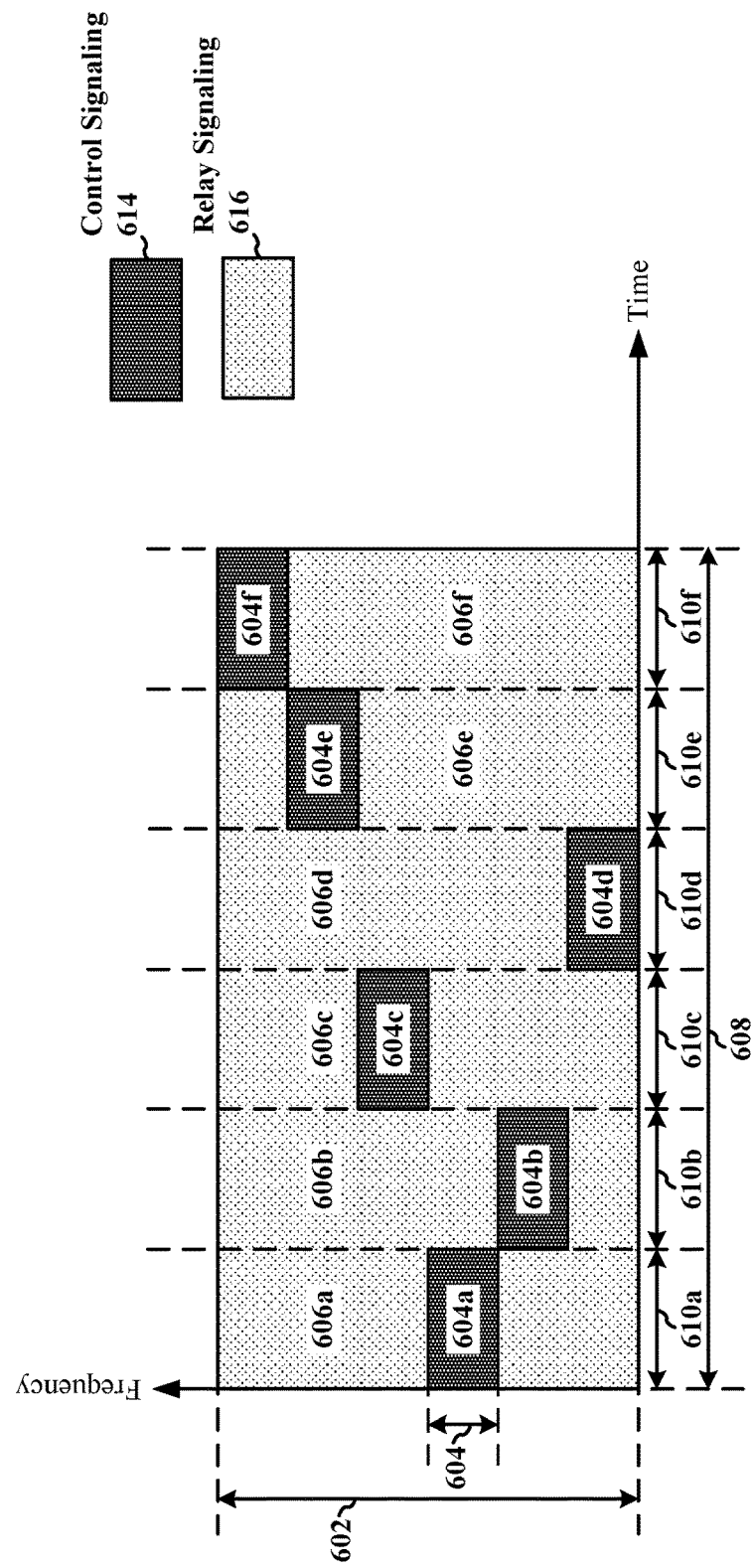
FIG. 6 is a diagram illustrating an example of control signaling configured on bandwidth parts of an available system bandwidth in a wireless communications system, in accordance with various aspects of the present disclosure.
Figure 7:
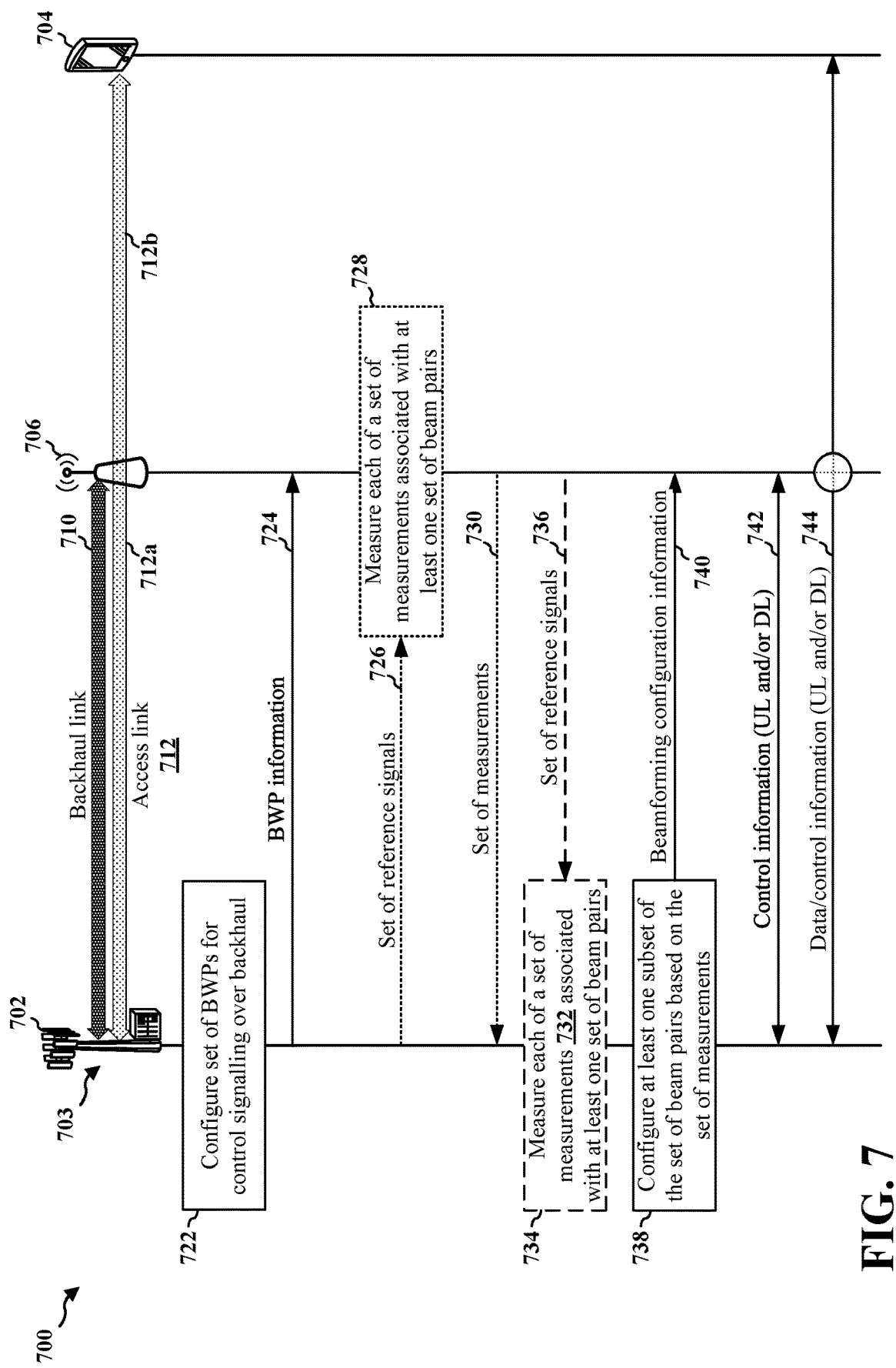
FIG. 7 is a call flow diagram illustrating another example of a wireless communications system in which a relay device communicates with a base station on a wireless backhaul link and relays signaling between the base station and a UE on a wireless access link, in accordance with various aspects of the present disclosure.

Referring to FIGS. 6 and 7, respective diagrams illustrate a set of resources 600 on which base station 702 may communicate with a UE 704 through a relay device 706 in a wireless communications system 700. In the context of FIGS. 1, 3, 4, and/or 5, the base station 702 may be implemented by the base station 102/180, the base station 310, the base station 402, and/or the base station 502, the UE 704 may be implemented by the UE 104, the UE 350, one of the UEs 404a, 404b, and/or the UE 504, and the relay device 706 may be implemented by the relay device 106, one of the relay devices 406a, 406b, 406c, and/or the relay device 506.

Data and/or control information may be communicated between the base station 702 and the UE 704 on an access link 712, which may traverse the relay device 706. Therefore, the access link 712 may be implemented at lower radio protocol layers (e.g., PHY layers) on a first relay access link 712a between the base station 702 and the relay device 706 and a second relay access link 712b between the relay device 706 and the UE 704. That is, the first relay access link 712a and the second relay access link 712b may be portions of the access link 712 that cumulatively implement the access link 712 between the base station 702 and the UE 704. In some aspects, data and/or control information communicated between the base station 702 and the UE 704 on the access link 712 may be referred to as "relay signaling" when communicated on the access link 712 through the relay device 706.

As the base station 702 (or a control interface 703) may configure the relay device 706 for communication in the wireless communications system 700, the base station 702 (and/or the control interface 703) may communicate control information with the relay device 706 over a backhaul link 710. In some aspects, control information communicated between the base station 702 (and/or the control interface 703) and the relay device 706 on the backhaul link 710 may be referred to as "control signaling."

In an exemplary RAN (e.g., a 5G NR RAN) of the wireless communications system 700, signaling may be communicated in a mmW/near-mmW spectrum that is configured on an available system bandwidth 602. Illustratively, the available system bandwidth 602 may be a BWP or other carrier bandwidth in FR2 of a 5G NR RAN, which may include frequency bands from approximately 24.25 GHz to approximately 52.6 GHz. For example, the available system bandwidth 602 may include a frequency band of 100 MHz, 200 MHz, 400 MHz, 800 MHz, 1 GHz, etc. Communication on the access link 712 may be configured to span all or some of the available system bandwidth 602. Relay signaling on the access link 712 between the base station 702 and the relay device 706 may be carried in wideband signals (e.g., communicated over the air as wideband analog signals) occupying at least a wideband portion of the available system bandwidth 602.

As both may be wireless in a RAN, the backhaul link 710 and the access link 712 may share resources of the available system bandwidth 602 configured for various communications in the RAN. To accommodate overlapping time and/or frequency resources on the different links 710, 712, the available system bandwidth 602 may be configurable into one or more BWPs, each of which may be a contiguous sub-band of the available system bandwidth 602. Communication on the backhaul link 710 may occupy configured BWPs, whereas communication on the access link 712 may occupy wideband portions of the available system bandwidth 602 excluding the configured BWPs.

Conventionally, a smaller amount of information may be communicated over the backhaul link 710 than over the access link 712 (e.g., the access link 712 may carry data and/or other control information absent from the backhaul link 710). Therefore, communication on the backhaul link 710 may be configured on one or more narrowband BWPs 604a, 604b, 604c, 604d, 604e, 604f, each of which may be a contiguous sub-band of the available system bandwidth 602. For example, each of the narrowband BWPs 604a-f on which communication on the backhaul link 710 may be configured may be a fractional amount of the available system bandwidth 602. For example, the fractional amount may be less than or equal to half of the available system bandwidth 602 and may be appreciably less in some aspects, such as approximately one-fourth, one-sixth, one-eighth, etc. Illustratively, each of the narrowband BWPs 604a-f may be configured to inclusively span 604 between approximately 10 MHz and 200 MHz.

Conversely, communication on the access link 712 may be configured on one or more wideband portions 606a, 606a, 606b, 606d, 606e, 606f of the available system bandwidth 602. Each of the wideband portions 606a-f may be configured to at least partially occupy the remaining portion of the available system bandwidth 602 excluding a corresponding one of the narrowband BWPs 604a-f. For example, each of the wideband portions 606a-f on which communication on the access link 712 may be configured may occupy at least half of the available system bandwidth 602. In some examples, each of the wideband portions 606a-f may occupy between approximately 50 MHz and 400 MHz, inclusively. As each of the narrowband BWPs 604a-f may occupy any contiguous sub-band of the available system bandwidth 602, each of the wideband portions 606a-f may be contiguous (e.g., as with the fourth wideband portion 606d and the sixth wideband portion 606f) or non-contiguous (e.g., as with the first wideband portion 606a, the second wideband portion 606b, the third wideband portion 606c, and the fifth wideband portion 606e).

In some examples, the available system bandwidth 602 may not be statically configured. That is, the respective narrowband BWPs 604a-f and wideband portions 606a-f configured for communication on each of the backhaul link 710 and the access link 712, respectively, may be dynamically (re)configurable, e.g., as environments change over time.

In the wireless communications system 700, various configurations and operations may be controlled and/or implemented by the base station 702. Therefore, the base station 702 (and/or the control interface 703) may configure 722 the set of narrowband BWPs 604a-f on which control signaling 714 is to be carried over the backhaul link 710. In some aspects, the base station 702 (and/or the control interface 703) may configure 722 the set of narrowband BWPs 604a-f to cumulatively span the entire available system bandwidth 602.

In some other aspects, the base station 702 (and/or the control interface 703) may configure 722 the set of narrowband BWPs 604a-f such that the cumulative narrowband BWPs 604a-f span at least one sub-band within the available system bandwidth 602. The base station 702 (and/or the control interface 703) may configure 722 the set of narrowband BWPs 604a-f to cumulatively span all or some of the available system bandwidth 602 based on configurations associated with one or more UEs (including the UE 704). For example, the base station 702 (and/or the control interface 703) may configure 722 the set of narrowband BWPs 604a-f to cumulatively span a portion of the available system bandwidth 602 based on one or more the sub-bands configured for serving one or more UEs (including the UE 704) connected with the base station 702 via the relay device 706. That is, the base station 702 (and/or the control interface 703) may configure 722 the set of narrowband BWPs 604a-f to cumulatively span the portion of the available system bandwidth 602 occupied by wideband relay signaling 616.

Further, the base station 702 (and/or the control interface 703) may configure 722 a set of wideband portions 606a-f on which relay signaling 616 is to be carried over the access link 712. In some aspects, the configuration of the wideband portions 606a-f may inherently result from the configuration of the narrowband BWPs 604a-f. That is, the base station 702 may implicitly configure each of the wideband portions 606a-f to occupy at least a portion of the available system bandwidth 602 that is not configured to be occupied by a concurrent one of the narrowband BWPs 604a-f.

In some examples, the base station 702 (and/or the control interface 703) may configure 722 the set of narrowband BWPs 604a-f over a timescale 608, which may be divided into a set of intervals 610a, 610b, 610c, 610d, 610e, 610f. The timescale 608 over which the base station 702 may configure the set of narrowband BWPs 604a-f may be of any suitable duration and may be defined in any suitable unit. For example, the timescale 608 may be 100 ms, 1 second, 5 frames, or the timescale 608 may be any other suitable duration defined in any other suitable unit of time. The base station 702 may configure the timescale 608 and/or the constituent intervals 610a-f according to some aspects. In some examples, however, the timescale 608 and/or the constituent intervals 610a-f may be preconfigured. For example, the timescale 608 and/or the constituent intervals 610a-f may be based on static values and/or may be based on other information defined according to one or more technical specifications or other standards promulgated by 3GPP or another standards organization.

Often in wireless communications environments, the link between a base station and a relay device may be static and/or may be infrequently variable, especially when the base station and the relay device reside at fixed locations. Thus, the strength and/or quality of the link between the base station and the relay device may be relatively consistent, e.g., as opposed to the strength and/or quality of a link with a UE, which may experience frequent changes as the UE changes locations and/or positions. Therefore, the timescale 608 may be relatively longer than some other similar timescales associated with other beam management and/or beamforming configurations, such as those associated with beam management for UEs that are subject to frequently changing link conditions.

Each of the narrowband BWPs 604a-f may be individually active at a respective one of the intervals 610a-f of the timescale 608. During each of the intervals 610a-f, a corresponding one of the narrowband BWPs 604a-f may be activated to carry control signaling 614 on the backhaul link 710, whereas the corresponding wideband portion 606a-f may be configured to carry relay signaling 616 on the access link 712. Beginning with the first narrowband BWP 604a active at the first interval 610a, the base station 702 and the relay device 706 may consecutively iterate over each of the intervals 610a-f in parallel until the timescale 608 elapses. In so doing, the base station 702 and the relay device 706 may adjust the region expected to carry the control signaling 614 to be consistent with an active one of the narrowband BWPs 604a-f.

Once the timescale 608 elapses, the base station 702 and the relay device 706 may return to the first interval 610a and again iterate in parallel over each of the intervals 610a-f, thereby activating a corresponding one of the narrowband BWPs 604a-f again. The base station 702 and the relay device 706 may repeatedly iterate over the intervals 610a-f of the timescale 608, e.g., until the base station 702 reconfigures the timescale 608, the intervals 610a-f, and/or the narrowband BWPs 604a-f activated thereby.

The base station 702 may transmit BWP information 724 that is received by the relay device 706. The BWP information 724 may explicitly or implicitly indicate each of the set of narrowband BWPs 604a-f. In some aspects, the base station 702 may further include, in the BWP information 724, information indicating the wideband portions 606a-f and/or information indicating the available system bandwidth 602.

According to one aspect, the base station 702 may further transmit, to the relay device 706, information indicating the timescale 608 and/or the intervals 610a-f in which a respective one of the narrowband BWPs 604a-f is active, such as in the BWP information 724 or in another message. For example, the timescale 608 and/or the intervals 610a-f may have been received in a previous message associated with a previous configuration of another set of narrowband BWPs, but the timescale 608 and/or the intervals 610a-f may remain configured for a current set of narrowband BWPs. According to another aspect, the timescale 608 and/or the intervals 610a-f applicable to the narrowband BWPs 604a-f may be preconfigured, e.g., based on one or more technical specifications or other standards promulgated by 3GPP or another standards organization.

With a configured set of narrowband BWPs 604a-f on which to communicate control signaling 614 over the backhaul link 710, the base station 702 may control beam management of beam pair links via which the base station 702 and the relay device 706 communicate. For beam management (e.g., including coarse and/or fine beam training), the base station 702 may determine a suitable beam pair from a set of candidate beam pairs for communication of control signaling 614 on the backhaul link 710. A set of candidate beam pairs may include a TX beam at a transmitter (e.g., one of the base station 702 or the relay device 706 of FIG. 7) and a corresponding RX beam at a receiver (e.g., the other of the base station 702 or the relay device 706). Potentially, one or more TX beams and/or RX beams may be included in more than one candidate beam pair.

The base station 702 may configure a set of candidate beam pairs from which a suitable beam pair may be identified through beam management (e.g., through beam training). As the base station 702 may control beam management in each of the narrowband BWPs 604a-f and channel conditions may significantly vary across some or all of the narrowband BWPs 604a-b, the base station 702 may configure a respective set of candidate beam pairs for each of the narrowband BWPs 604a-f. Respective sets of candidate beam pairs may have some, all, or none of their constituent candidate beam pairs in common.

In some aspects, the base station 702 may configure a set of uplink candidate beam pairs in which each beam pair is composed of a TX beam at the relay device 706 and a corresponding RX beam at the base station 702, and may separately configure a set of downlink candidate beam pairs in which each beam pair is composed of a TX beam at the base station 702 and a corresponding RX beam at the relay device 706. Similarly, the base station 702 may configure sets of uplink and/or downlink candidate beam pairs potentially available for communication between the relay device 706 and the UE 704 on the access link 712, and the base station 702 may configure respective active or serving beams for uplink and/or downlink communication on the access link 712 between the relay device 706 and the UE 704 based sets of uplink and/or downlink candidate beam pairs, respectively.

Beam management by the base station 702 may be based on one or more measurements indicative of the strengths and/or qualities of candidate beam pair links. Thus, the base station 702 may be configured to identify or select, from the candidate beam pair links, one beam pair link offering satisfactory strength and/or quality for communication of control signaling 614 on the backhaul link 710. For example, the base station 702 may be configured to select a beam pair from the candidate set associated with a highest or "best" measurement indicative of link strength and/or quality.

Based on beam management associated with the backhaul link 710, the base station 702 may determine a suitable beam pair link for communication of relay signaling 616 on the access link 712. In particular, the set of narrowband BWPs 604a-f may span all or a sufficient portion of the available system bandwidth 602 such that beam pairs configured via beam management for the backhaul link 710 may provide satisfactory strength and/or quality when used for wideband relay signaling 616 on the access link 712 (e.g., on wideband portions 606a-f). For example, beam management associated with wideband relay signaling 616 may be discretely restricted during each of the intervals 610a-f to a corresponding one of the set of narrowband BWPs 604a-f. Effectively, channel conditions associated with the region of the available system bandwidth 602 that is cumulatively spanned by the set of narrowband BWPs 604a-f over the timescale 608 may be sufficiently representative of the channel conditions associated with the wideband portion of the available system bandwidth 602 over the timescale 608. Accordingly, during each of the intervals 610a-f over the timescale 608, the base station 702 may perform a respective beam management procedure that is restricted to the active one of the narrowband BWPs 604a-f.

As beam management may be based on measurements indicative of the qualities or conditions of candidate beam pair links, one or more sets of reference signals 726, 736 may be communicated between the base station 702 and the relay device 706. The sets of reference signals 726, 736 may be used by the receiving one of the base station 702 or the relay device 706 to measure each of a set of measurements 730 associated with downlink communication or each of a set of measurements 732 associated with uplink communication. Thus, the set of measurements 730 measured 728 by the relay device 706 may be indicative of strengths and/or qualities of candidate beam pair links for downlink communication, and the set of measurements 732 measured 734 by the base station 702 may be indicative of strengths and/or qualities of candidate beam pair links for uplink communication.

In some aspects, a respective beam management procedure may be separately performed on both the downlink (e.g., some operations of a downlink beam management procedure are illustrated in FIG. 7 as dotted lines) and the uplink (e.g., some operations of an uplink beam management procedure are illustrated in FIG. 7 as dashed lines). For example, respective beam management procedures may be separately performed on both the downlink and the uplink based on a lack of beam reciprocity or beam symmetry associated with downlink beam pairs and uplink beam pairs.

In some other aspects, however, a beam management procedure may be performed on either one of the downlink or the uplink, whereas a beam management for the other one of the downlink or the uplink may be omitted. Either one of an uplink beam management procedure or a downlink beam management procedure may be performed, for example, if beam reciprocity or beam symmetry associated with downlink beam pairs and uplink beam pairs is maintained, if one of uplink or downlink communication is substantially more frequent than and/or is prioritized over the other of uplink or downlink communication, if a beam pair link configured for one of uplink or downlink communication is determined to be sufficient for the other of uplink or downlink communication, and so forth.

In such aspects in which either an uplink or a downlink beam management procedure is omitted, one or more operations associated with the omitted one of the uplink or downlink beam management procedures may be consequently omitted. For example, if the downlink beam management procedure is omitted, then one or more operations illustrated in FIG. 7 as dotted lines for the downlink beam management procedure may be omitted. Similarly, if the uplink beam management procedure is omitted, then one or more operations illustrated in FIG. 7 as dashed lines for the uplink beam management procedure may be omitted.

In various aspects of a beam management procedure associated with downlink communication, the base station 702 may transmit a set of reference signals 726 that are received by the relay device 706 in the downlink in order for the relay device 706 to measure values indicative of strengths and/or qualities of downlink candidate beam pair links. Each one of the set of reference signals 726 may be, for example, a SS/PBCH block, a CSI-RS, another type of downlink reference (or synchronization) signal, or a combination of at least two reference signals.

The base station 702 may transmit each of the set of reference signals 726 via a respective one of a set of TX beams generated at the base station 702. Further, the base station 702 may transmit the set of reference signals 726 on each of the narrowband BWPs 604a-f, a respective one of which may be active at a corresponding one of the intervals 610a-f consecutively traversed by the base station 702 over the timescale 608.

Correspondingly, the relay device 706 may receive one or more reference signals of the respective set of reference signals 726 on each of the narrowband BWPs 604a-f, a respective one of which may be active at a corresponding one of the intervals 610a-f consecutively traversed by the relay device 706 (e.g., in parallel with the base station 702) over the timescale 608. The relay device 706 may receive one or more reference signals of the respective set of reference signals 726 via at least one RX beam of a set of RX beams generated at the relay device 706.

For a respective one of the narrowband BWPs 604a-f that is active during each of the intervals 610a-f, the relay device 706 may measure 728 each of a set of measurements 730 associated with the set of candidate beam pairs configured for the respective active one of the narrowband BWPs 604a-f. That is, for each reference signal of a respective set of reference signals 726 received via an RX beam in the respective one of the narrowband BWPs 604a-f activated during the current one of the intervals 610a-f, the relay device 706 may measure at least one respective measurement of the set of measurements 730 for at least one of the associated set of candidate beam pairs. Accordingly, each of the set of measurements 730 may be indicative of link strength and/or quality in an active one of the narrowband BWPs 604a-f for one candidate beam pair that includes the RX beam, via which a reference signal of the respective set of reference signals 726 is received, and a TX beam, via which that same reference signal is transmitted.

The relay device 706 may measure each of the set of measurements 730 according to any suitable approach for measuring the strengths and/or qualities from received signals, and the relay device 706 may express each of the set of measurements 730 in any suitable unit indicative of strengths and/or qualities measured from received signals. By way of example, the relay device 706 may measure each of the set of measurements 730 as at least one of a reference signal received power (RSRP), a reference signal received quality (RSRQ), a signal-to-noise ratio (SNR), a signal-to-interference-plus-noise ratio (SINR), a received signal strength indicator (RSSI), and the like.

Subsequently, the relay device 706 may transmit the set of measurements 730 that is received by the base station 702. In some aspects, the relay device 706 may transmit a respective set of measurements 730 for each of the set of narrowband BWPs 604a-f. The relay device 706 may transmit a respective set of measurements 730 after each of the intervals 610a-f during which each of the respective set of measurements 730 may be measured in the active one of the narrowband BWPs 604a-f.

Alternatively, the relay device 706 may transmit the set of measurements 730 after the timescale 608 has elapsed, e.g., prior to returning to the first interval 610a to repeat at least a portion of the beam management procedure over the timescale 608. For example, the relay device 706 may transmit each set of measurements 730, respectively associated with one of the narrowband BWPs 604a-f, in a separate message. In another example, the relay device 706 may transmit all measurements, measured over all of the narrowband BWPs 604a-f respectively activated over all of the intervals 610a-f, as one set of measurements 730 over the timescale 608.

In various aspects of a beam management procedure associated with uplink communication, some operations may be similar to those described in the context of a downlink beam management procedure but those operations may be transposed between the base station 702 and the relay device 706. In particular, the relay device 706 may transmit a set of reference signals 736 to the base station 702 in the uplink in order for the base station 702 to measure values indicative of link strengths and/or qualities for some or all uplink candidate beam pair links. Each of the set of reference signals 736 may be, for example, an SRS, another type of uplink reference (or synchronization) signal, or a combination of at least two reference signals.

The relay device 706 may transmit each of the set of reference signals 736 via a respective one of a set of TX beams generated at the relay device 706. The relay device 706 may transmit a set of reference signals 736 on each of the narrowband BWPs 604a-f, a respective one of which may be active during each of the intervals 610a-f consecutively iterated over by the relay device 706.

Correspondingly, the base station 702 may receive one or more reference signals of the respective set of reference signals 736 on each of the narrowband BWPs 604a-f, a respective one of which may be active during each of the intervals 610a-f consecutively iterated over by the base station 702 (e.g., in parallel with the relay device 706). The base station 702 may receive one or more reference signals of the respective set of reference signals 736 via at least one RX beam of a set of RX beams generated at the base station 702 as one half of one of the set of candidate beam pairs configured for the active one of the narrowband BWPs 604a-f.

For a respective one of the narrowband BWPs 604a-f that is active during each of the intervals 610a-f, the base station 702 may measure 734 each of a set of measurements 732 associated with each of a respective set of candidate beam pairs. That is, for each reference signal of a set of reference signals 736 received via an RX beam in a respective one of the narrowband BWPs 604a-f that is activated during each of the intervals 610a-f, the base station 702 may measure 734 at least one respective measurement of the set of measurements 732. Accordingly, each of the set of measurements 732 may be indicative of link strength and/or quality in an active one of the narrowband BWPs 604a-f for one uplink candidate beam pair that includes the RX beam, via which one of the respective set of reference signals 736 is received, and a TX beam, via which that same one of the respective set of reference signals 736 is transmitted.

The base station 702 may measure 734 each of the set of measurements 732 according to any suitable approach for measuring the strengths and/or qualities of received signals, and the base station 702 may express each of the set of measurements 732 in any suitable unit indicative of strengths and/or qualities of beam pairs based on received signals. By way of example, the base station 702 may measure 734 each of the set of measurements 732 as at least one of an RSRP, an RSRQ, a SNR, a SINR, a RSSI, and the like.

In some aspects, the base station 702 may truncate the uplink and/or downlink beam management procedures during each of the intervals 610a-f. In an exemplary wireless communications system 700, the base station 702, the relay device 706, and/or the UE 704 may benefit from reductions in overhead (e.g., overheads associated with time, power, and/or other computational resources) incurred by beam management procedures. For example, truncating a beam management procedure may prevent one or more of the intervals 610a-f from being substantially dedicated to beam management.

In truncating a beam management procedure, one or more beam pairs may be removed from a set of candidate beam pairs over which measurements for one of the sets of measurements 730, 732 are performed. Removal of one or more beam pairs from the set of candidate beam pairs inherently prevents the constituent TX and RX beams from being applied by the base station 702 and the relay device 706 during beam management.

Consistently therewith, then, removal of a number of beam pairs from the set of candidate beam pairs may commensurately eliminate transmission and reception of a proportional number (e.g., equal number) of reference signals of the downlink set of reference signals 726 and/or the uplink set of reference signals 736. Furthermore, a number of measurements 728, 734 performed by the relay device 706 or the base station 702 may be reduced in proportion to (e.g., equal to) the number of beam pairs removed from a set of candidate beam pairs and likewise reduced in proportion to (e.g., equal to) the number of reference signals eliminated from transmission and reception in the downlink set of reference signals 726 and/or the uplink set of reference signals 736.

In order to simplify, expedite, and/or otherwise reduce beam management overhead, the base station 702 may truncate beam management in at least one of the narrowband BWPs 604a-f based on one or more criteria. In some aspects, the one or more criteria based on which the base station 702 may truncate beam management may be associated with at least one set of measurements 730, 732. The base station 702 may truncate beam management in the context of the intervals 610a-f (e.g., intervals over which the base station 702 and the relay device 706 are currently iterating during the timescale 608) and/or in the context of future intervals (e.g., intervals over which the base station 702 and the relay device 706 will iterate after the last interval 610f elapses, which may be a cycle that repeats the current intervals 610a-f).

In some aspects, the base station 702 may remove a first beam pair from a set of candidate beam pairs that is configured for a respective one of the narrowband BWPs 604a-f activated during a current instance of one of the intervals 610a-f. However, it may be appreciated that in some examples, the set of candidate beam pairs, reconfigured with the first beam pair removed, may not be applied during the current instance of one of the intervals 610a-f, but instead may be applied during a next instance of that one of the intervals 610a-f, which is reached during a subsequent cycle (e.g., next consecutive cycle) over the intervals 610a-f. The base station 702 may remove a first beam pair from a set of candidate beam pairs when a measurement of one of the sets of measurements 730, 732 indicates that the link strength and/or quality of the first beam pair is insufficient to carry control signaling 614 on one of the narrowband BWPs 604a-f and/or relay signaling 616 on a concurrent one of the wideband portions 606a-f during an associated one of the intervals 610a-f.

In order to determine that the strength and/or quality of a link on a beam pair is insufficient, the base station 702 may compare at least one measurement of one of the sets of measurements 730, 732 corresponding to that beam pair with a first threshold, which may be associated with sufficiency of link strength and/or quality of a beam pair. The base station 702 may determine whether the beam pair's corresponding at least one measurement satisfies (e.g., meets or exceeds) the first threshold based on the comparison. The base station 702 may determine that a beam pair is insufficient to have a link configured thereon when the base station 702 determines that at least one measurement corresponding to the beam pair fails to satisfy the first threshold and, due to the link insufficiency of the beam pair, the base station 702 may remove that beam pair from the set of candidate beam pairs.

In some other aspects, the base station 702 may configure a set of candidate beam pairs for one of the narrowband BWPs 604a-f based on at least one measurement of one of the sets of measurements 730, 732 that is associated with another one of the narrowband BWP 604a-f. For example, a respective set of measurements 730, 732 may include at least one measurement indicative of the link strength and/or quality of a first beam pair in one of the narrowband BWPs 604a-f that is sufficiently representative of the link strength and/or quality of a second beam pair in another one of the narrowband BWPs 604a-f. The first beam pair may share at least one of a TX beam and/or an RX beam in common with the second beam pair sufficiently represented by the first beam pair and, therefore, the first and second beam pairs may be the same.

Particularly, the strengths and/or qualities of a beam pair may be sufficiently similar across two or more of the narrowband BWPs 604a-f when those two or more narrowband BWPs 604a-f are sufficiently proximate to one another (e.g., adjacent to one another, as with the first and second narrowband BWPs 604a, 604b) and/or channel conditions (e.g., including blockers, interfering signals, etc.) experienced on a beam pair link in one of the narrowband BWPs 604a-f may be sufficiently similar to those of the same beam pair link in another one of the narrowband BWPs 604a-f. The base station 702 may remove a first beam pair from a set of candidate beam pairs based on an inference of the link strength and/or quality of the first beam pair in one of the narrowband BWPs 604a-f that is derived from at least one measurement of one of the sets of measurements 730, 732 associated with the first beam pair in a different one of the narrowband BWPs 604a-f. Thus, removal of one or more beam pairs from a set of candidate beam pairs for one of the narrowband BWPs 604a-f may implicitly indicate that those one or more beam pairs should likewise be removed from a set of candidate beam pairs for one or more other narrowband BWPs 604a-f.

Following measurements 728, 734 performed by the relay device 706 and/or the base station 702 for downlink and/or uplink communication, the base station 702 may determine at least one set of measurements 730, 732 indicative of link strengths and/or qualities of one or more downlink and/or uplink candidate beam pairs in the narrowband BWPs 604a-f. In the downlink, for example, the base station 702 may determine the set of measurements 730 indicative of link strengths and/or qualities of one or more downlink candidate beam pairs in the narrowband BWPs 604a-f based on the set of measurements 730 received from the relay device 706. In the uplink, however, the base station 702 may determine the set of measurements 732 indicative of link strengths and/or qualities of one or more uplink candidate beam pairs in the narrowband BWPs 604a-f by measuring 734 each of a set of measurements 732 based on a set of reference signals 736 received from the relay device 706.

Based on at least one set of measurements 730, 732, the base station 702 may configure 738 at least one subset of a set of candidate beam pairs. Each of the set of candidate beam pairs may be configured to be applied during an associated one of the intervals 610a-f on the correspondingly activated one of the narrowband BWPs 604a-f. In one aspect, the base station 702 may configure 738 a subset of a set of candidate beam pairs for downlink communication, e.g., based on the set of measurements 730 received from the relay device 706. In another aspect, the base station 702 may configure 738 a subset of a set of candidate beam pairs for uplink communication, e.g., based on the set of measurements 732 measured by the base station 702 based on the set of reference signals 736 received from the relay device 706.

The at least one subset of the set of candidate beam pairs may itself be a set of active beam pairs, each of which may be an active beam pair, a serving beam pair, and/or other communication beam pair. When configured, an active beam pair may be associated with one of the one of the intervals 610a-f and/or one of the narrowband BWPs 604a-f. During the associated one of the intervals 610a-f, the active beam pair may be used to communicate on a wideband portion of the available system bandwidth 602 that encompasses the associated one of the narrowband BWPs 604a-f. Thus, based on the at least one subset of the set of candidate beam pairs configured as a set of active beam pairs, one of the set of active beam pairs may be used during an associated one of the intervals 610a-f to communicate both control signaling 614 on a correspondingly active one of the narrowband BWPs 604a-f (e.g., over the backhaul link 710) and relay signaling 616 on the concurrent one of the wideband portions 606a-f (e.g., over the access link 712).

According to various aspects, the base station 702 may configure 738 at least one subset of the set of candidate beam pairs by comparing some or all of the measurements of one of the sets of measurements 730, 732 to one or more other measurements of that one of the sets of measurements 730, 732. The base station 702 may rank or order at least some of the set of candidate beam pairs based on the comparison. For example, the base station 702 may rank or order beam pairs of the set of candidate beam pairs according to the comparisons between some or all of the measurements of one of the sets of measurements 730, 732, and therefore, ranking or ordering measurements of one of the sets of measurements 730, 732 may reflect the relative relationships between strengths and/or qualities of candidate beam pairs, e.g., for downlink or for uplink.

In configuring 738 the at least one subset of the set of candidate beam pairs, the base station 702 may determine at least one beam pair associated with a satisfactory strength and/or quality of a link thereon. For example, the base station 702 may determine one or more beam pairs associated with a respective "highest" or "best" measurement in the one of the sets of measurements 730, 732 during each of the intervals 610a-f on a correspondingly active one of the narrowband BWPs 604a-f.

In some further aspects, the base station 702 may configure 738 at least one subset of the set of beam pairs by comparing each measurement of one of the sets of measurements 730, 732 to a second threshold associated with strengths and/or qualities of beam pair links (e.g., the second threshold may be the same or different for uplink and downlink communication). The second threshold may provide a floor or minimum acceptable strength and/or quality for beam pair links, e.g., such that beam pair links below the floor are determined to be insufficient to carry communication. Thus, measurements of one of the sets of measurements 730, 732 failing to satisfy (e.g., meet or exceed) the second threshold may be excluded from a list of candidate beam pairs. According to some aspects, then, any beam pair associated with a measurement of one of the sets of measurements 730, 732 may be acceptable for use, and therefore, a beam pair associated with a "highest" or "best" measurement in the one of the sets of measurements 730, 732 may not necessarily be the default configuration implemented by the base station 702.

In configuring 738 at least one subset of the set of candidate beam pairs, the base station 702 may configure 738 a first beam pair for the backhaul link 710, carried in one of the narrowband BWPs 604a-f, and a second beam pair for the access link 712, carried in one of the wideband portions 606a-f. In some aspects, however, the first and second beam pairs may be the same beam pair or may include at least one beam in common (e.g., a TX or RX beam at base station 702 may be common between the first and second beam pairs when there are at least two paths to a corresponding RX or TX beam at the relay device 706). For example, the base station 702 and the relay device 706 may be configured to communicate (e.g., either in the uplink or in the downlink) both control signaling 614 in the narrowband BWPs 604a-f and relay signaling 616 in the wideband portions 606a-f via one beam pair or via two beam pairs having one beam in common.

During one of the intervals 610a-f, at least one beam pair (or two beam pairs having a beam of the relay device in common) of the at least one subset may be sufficient for communicating control signaling 614 on the active one of the narrowband BWPs 604a-f and relay signaling 616 in the concurrent one of the wideband portions 606a-f. As each the cumulative narrowband BWPs 604a-f span all or most of the available system bandwidth 602 on which wideband analog signals are carried over the timescale 608, the base station 702 may potentially configure one beam at the relay device 706 paired with the same beam (i.e., one beam pair) or a different beam (i.e., two beam pairs sharing a common beam) at the base station 702 for communication of both control signaling 614 on the active one of the narrowband BWPs 604a-f and relay signaling 616 in the concurrent one of the wideband portions 606a-f.

Following configuration of the at least one subset of the set of candidate beam pairs, the base station 702 may transmit beamforming configuration information 740 that is received by the relay device 706. The beamforming configuration information 740 may indicate the at least one subset of the set of candidate beam pairs to be used for communication during the intervals 610a-f of control signaling 614 and/or relay signaling 616. For example, the beamforming configuration information 740 may indicate one or more beam indexes corresponding to one or more beams, each of which may be one half of a beam pair included in the at least one subset of the set of candidate beam pairs. The other half of each of the beam pairs may be a beam to be applied by the base station 702 in order to establish the beam pair link the is active during an associated one of the intervals 610a-f.

Additionally, the beamforming configuration information 740 may indicate one of the intervals 610a-f and/or one of the narrowband BWPs 604a-f at which each beam pair of the at least one subset is to be applied. Thus, the base station 702 may configure the relay device 706 to iterate over the at least one subset of the set of candidate beam pairs by applying one of the beam pairs that is configured to be active for communication during an associated one of the intervals 610a-f, applying a next one of the beam pairs that is configured to be active during a next one of the intervals 610a-f (e.g., the next consecutive one of the intervals 610a-f), and so forth until the timescale 608 elapses. Once the timescale 608 elapses, the relay device 706 may cycle through beam management procedures on each of the narrowband BWPs 604a-f according to the intervals 610a-f, such as by reapplying the first beam pair configured to be active during the associated first interval 610a.

In some aspects, the beamforming configuration information 740 may indicate a first subset of the set of candidate beam pairs to be applied for downlink communication and a second subset of the set of candidate beam pairs to be applied for uplink communication. Potentially, the first and second subsets of beam pairs may be the same and, if so, the beamforming configuration information 740 may indicate a subset of the set of candidate beam pairs as well as indicate that the at least one subset of the set of candidate beam pairs is applicable to both downlink and uplink communication. For example, one subset of the set of candidate beam pairs may be configured for both downlink and uplink communication if beam reciprocity or beam symmetry associated with downlink beam pairs and uplink beam pairs is maintained.

Subsequently, the base station 702 and the relay device 706 may communicate control information 742 associated with the relay device 706 on the backhaul link 710 and may communicate data/control information 744 associated with the UE 704 on the access link 712. To do so, the first interval 610a of the timescale 608 may be initiated, e.g., by the base station 702 and signaled to the relay device 706. Initially, the base station 702 and the relay device 706 may apply their respective individual beams of a first beam pair configured for the associated first interval 610a, consistent with the at least one subset of the set of candidate beam pairs indicated by the beamforming configuration information 740. During the first interval 610a, the base station 702 and the relay device 706 may communicate, via the first beam pair of the at least one subset, the control information 742 on the first narrowband BWP 604a, and the data/control information 744 on the first wideband portion 606a.

According to one example of downlink communication, a respective one of the at least one subset of the set of candidate beam pairs indicated by the beamforming configuration information 740 may include, for an associated one of the intervals 610a-f in which the respective beam pair is configured to be active, a respective TX beam of the base station 702 and a complementary RX beam of the relay device 706. During the first interval 610a, the base station 702 may generate at least a first TX beam of at least a first beam pair indicated by the at least one subset of the set of candidate beam pairs configured for at least downlink communication in the first interval 610a. Similarly, the relay device 706 may generate at least a first RX beam that is complementary to the at least one TX beam of the base station 702 in the at least one first beam pair, as configured for the associated first interval 610a according to the beamforming configuration information 740.

The base station 702 may then transmit, via at least the first TX beam of the first beam pair, the control information 742 on the first narrowband BWP 604a and the data/control information 744 on the first wideband portion 606a. Pursuant thereto, the relay device 706 may receive, via at least the first RX beam of at least the first beam pair, the control information 742 on the first narrowband BWP 604a and the data/control information 744 on the first wideband portion 606a.

According to one example of uplink communication, at least one subset of the set of candidate beam pairs may include, for the intervals 610a-f, one or more pairs of a respective TX beam of the relay device 706 and a complementary RX beam of the base station 702. During the first interval 610a, the relay device 706 may generate at least a first TX beam included in at least the first beam pair of the at least one subset of the set of candidate beam pairs configured for uplink communication in the first interval 610a. Similarly, the base station 702 may generate at least a first RX beam of at least the first beam pair that is configured for uplink communication in the first interval 610a. The relay device 706 may transmit, via at least the first TX beam, the control information 742 on the first narrowband BWP 604a and the data/control information 744 on the first wideband portion 606a. The base station 702 may then receive, via the at least the first RX beam, the control information 742 on the first narrowband BWP 604a and the data/control information 744 on the first wideband portion 606a.

Once the first interval 610a elapses, the base station 702 and the relay device 706 may apply their respective individual beams of at least a second beam pair of the at least one subset of the set of candidate beam pairs that is associated with the second interval 610b, e.g., as configured 738 by the base station 702 and indicated by the beamforming configuration information 740. During the second interval 610b, the base station 702 and the relay device 706 may communicate, via at least respective RX and TX beams of at least the second beam pair, the control information 742 on the second narrowband BWP 604b and the data/control information 744 on the second wideband portion 606b.

Thus, when one of the intervals 610a-f elapses, the base station 702 and the relay device 706 may apply respective individual beams included in a next beam pair of the at least one subset of the set of candidate beam pairs that is configured for the associated next one of the intervals 610a-f. For example, in some examples, the associated next one of the intervals 610a-f may consecutively follow the elapsed one of the intervals 610a-f. During the next one of the intervals 610a-f, the base station 702 and the relay device 706 may communicate, via the next beam pair associated with the next one of the intervals 610a-f, the control information 742 on the corresponding next narrowband BWP 604b and the data/control information 744 on the concurrent next wideband portion 606b.

Finally, after all of the intervals 610a-f elapse such that the duration of the timescale 608 concludes, the first interval 610a may be reinitiated. Consistent therewith, the base station 702 and the relay device 706 may apply their respective beams included in the active beam pairs of the at least one subset configured from the set of candidate beam pairs, and may communicate control signaling 614 on the narrowband BWPs 604a-f and relay signaling 616 on the wideband portions 606a-f via their respectively applied beams as the first interval 610a and the subsequent intervals 610b-f are consecutively traversed.

Figure 8:
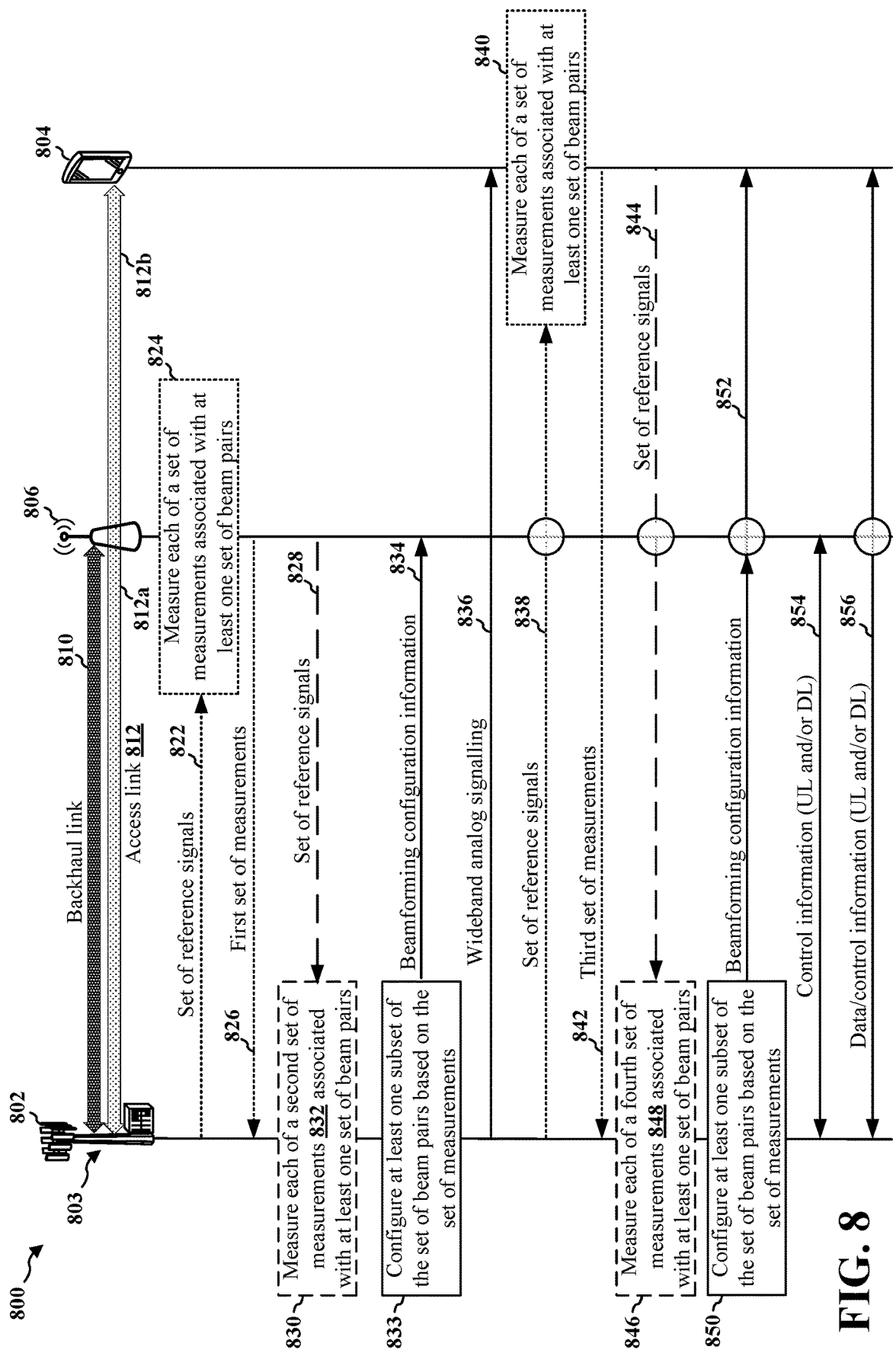
FIG. 8 is a call flow diagram illustrating a further example of a wireless communications system in which a relay device communicates with a base station on a wireless backhaul link and relays signaling between the base station and a UE on a wireless access link.

Now referring to FIG. 8, a call flow diagram illustrates exemplary operations and communications in a wireless communications system 800 that includes, inter alia, a base station 802 configured to communicate with a UE 804 through a relay device 806. In the context of FIGS. 1, 3 to 5, and 8, the base station 802 may be implemented by the base station 102/180, the base station 310, the base station 402, the base station 502, and/or the base station 702, the UE 804 may be implemented by the UE 104, the UE 350, one of the UEs 404a, 404b, the UE 504, and/or the UE 704, and the relay device 806 may be implemented by the relay device 106, one of the relay devices 406ac, the relay device 506, and/or the relay device 706.

Data and/or control information may be communicated between the base station 802 and the UE 804 on an access link 812, which may traverse the relay device 806. Therefore, the access link 812 may be implemented at lower radio protocol layers (e.g., PHY layers) on a first relay access link 812a between the base station 802 and the relay device 806 and a second relay access link 812b between the relay device 806 and the UE 804. That is, the first relay access link 812a and the second relay access link 812b may be portions of the access link 812 that cumulatively implement the access link 812 between the base station 802 and the UE 804. In some aspects, data and/or control information communicated between the base station 802 and the UE 804 on the access link 812 may be referred to as "relay signaling" when communicated on the access link 812 through the relay device 806.

As the base station 802 (or a control interface 803) may configure the relay device 806 for communication in the wireless communications system 800, the base station 802 (and/or the control interface 803) may communicate control information with the relay device 806 over a backhaul link 810. In some aspects, control information communicated between the base station 802 (and/or the control interface 803) and the relay device 806 on the backhaul link 810 may be referred to as "control signaling."

In an exemplary RAN (e.g., a 5G NR RAN) of the wireless communications system 800, signaling may be communicated in a mmW/near-mmW spectrum. As both may be wireless in a RAN, the backhaul link 810 and the access link 812 may share resources configured for various mmW/near-mmW communications in the RAN. Therefore, the base station 802, the UE 804, and the relay device 806 may use beamforming to communicate on an applicable one of the links 810, 812.

For beamformed communication, a beam pair may be configured between one of the base station 802, the UE 804, or the relay device 806 acting as a transmitting side and another one of the base station 802, the UE 804, or the relay device 806 acting as a receiving side. However, one beam pair may be insufficient to carry all communication in both the uplink and downlink transmission directions between the transmitting side and the receiving side. Particularly, one beam pair link may lack the strength and/or quality requisite for carrying different communication links (e.g., the backhaul link 810, the first relay access link 812a of the access link 812, the second relay access link 812b of the access link 812) in different transmission directions (e.g., uplink or downlink) on different sets of subcarriers. As relatively very small waves may be inherent with mmW/near-mmW communication, a beam pair link may be beamformed on a discrete set of subcarriers, but may be constrained to be within a short range subject to high path loss. Consequently, the strength and/or quality of the beam pair link may be especially susceptible to channel conditions.

Thus, when channel conditions vary between outside of the discrete set of subcarriers on which the beam pair link is beamformed, the beam pair link may fail on other subcarriers outside of the discrete set, such as because beam reciprocity or beam symmetry may be unattainable across different links and/or across different transmission directions when respectively configured on different sets of subcarriers. In other words, one beam pair link beamformed on one discrete set of subcarriers may be unsuitable to carry signaling outside of that discrete set of subcarriers, and therefore, as different logical links and different transmission directions may be configured on different set of subcarriers, one beam pair link may fail to carry signaling on each of the different sets of subcarriers on which different logical links in different transmission directions are configured.

In view of the foregoing, mmW/near-mmW communication in the wireless communications system 800 may benefit from beamforming configurations associated with different logical links and/or different transmission directions (e.g., uplink and downlink). As described in the present disclosure, respective beam pairs may be configured for some or all of the different transmission directions on different logical links in order to cover respective frequency regions carrying each of the transmission directions on each of the logical links. Effectively, the base station 802, the UE 804, and/or the relay device 806 may support coverage of multiple sets of subcarriers when configured according to multiple beam pairs, thus avoiding the ineffectiveness inherent from communicating on sets of subcarriers that not contemporaneously coverable by one beam pair.

According to the techniques and approaches described herein, the base station 802 may control beam management (e.g., including beam training and/or refinement) across each of the base station 802, the UE 804, and the relay device 806. Therefore, the base station 802 may be responsible for configuring each of the beam pairs applicable to both transmission directions on both the backhaul link 810 and the access link 812 (and thus applicable to the first and second relay access links 812a-b of the access link 812).

In various aspects, both transmission directions on both the backhaul link 810 and the access link 812 may be assigned to respective sets of subcarriers that may or may not overlap. In practice, then, the base station 802 may configure at least two beam pairs to be active for one-hop and multi-hop communication between the base station 802 and the UE 804 through at least one relay device 806, and at least two beam pairs may be concurrently or contemporaneously applied for at least a portion of one-hop and multi-hop communication.

Plausibly, the at least two beam pairs may include up to six beam pairs configured for at least one-hop communication between the base station 802 and the UE 804 through the relay device 806: (1) a first beam pair link between the base station 802 and the relay device 806 for the backhaul link 810 in the uplink; (2) a second beam pair link between the base station 802 and the relay device 806 for the backhaul link 810 in the downlink; (3) a third beam pair link between the base station 802 and the relay device 806 for the access link 812 (e.g., the first relay access link 812a) in the uplink; (4) a fourth beam pair link between the base station 802 and the relay device 806 for the access link 812 (e.g., the first relay access link 812a) in the downlink; (5) a fifth beam pair link between the UE 804 and the relay device 806 for the access link 812 (e.g., the second relay access link 812b) in the uplink; and (6) a sixth beam pair link between the UE 804 and the relay device 806 for the access link 812 (e.g., the second relay access link 812b) in the downlink.

While up to six beam pairs may be applicable to the transmission directions on the backhaul and access links 810, 812, one or more beam pairs may be the same. For example, one beam pair may be capable of covering sets of subcarriers carrying different transmission directions and/or different links. Further, at least two beam pairs may share the same TX beam or the same RX beam, such as when two paths are available in the environment between one TX or RX beam at one side and two RX or TX beams at the other side. Thus, beam management procedures by the base station 802 to configure six different beam pairs may be unnecessary.

According to some aspects, the base station 802 may configure communication on the backhaul link 810 prior to configuring communication on the access link 812. Referring to FIG. 5, for example, one or more backhaul-related procedures 522 may be performed before the UE 504 connects with the base station 502 during one or more of the access link-related procedures 524. The backhaul-related procedures 522 may include a beam management procedure (e.g., including beam training and/or beam refinement) with the relay device 506, e.g., as part of the hybrid-node configuration procedure 538. Prior to beam management, however, the backhaul link 510 may be established between the base station 502 and the relay device 506. As part of the establishment of the backhaul link 510, the base station 502 may configure a set of subcarriers for the backhaul link 510.

Again referring to FIG. 8, the base station 802 may perform a beam management procedure with the relay device 806 on the backhaul link 810 in both the downlink (e.g., some operations of a downlink beam management procedure are illustrated in FIG. 8 as dotted lines) and the uplink (e.g., some operations of an uplink beam management procedure are illustrated in FIG. 8 as dashed lines). For example, respective beam management procedures may be separately performed on both the downlink and the uplink based on a lack of beam reciprocity or beam symmetry associated with downlink beam pairs and uplink beam pairs.

In some other aspects, however, a beam management procedure may be performed on either one of the downlink or the uplink, whereas a beam management for the other one of the downlink or the uplink may be omitted. Either one of an uplink beam management procedure or a downlink beam management procedure may be performed, for example, if beam reciprocity or beam symmetry associated with downlink beam pairs and uplink beam pairs is maintained, if one of uplink or downlink communication is substantially more frequent than and/or is prioritized over the other of uplink or downlink communication, if a beam pair link configured for one of uplink or downlink communication is determined to be sufficient for the other of uplink or downlink communication, and so forth.

In such aspects in which either an uplink or a downlink beam management procedure is omitted, one or more operations associated with the omitted one of the uplink or the downlink beam management procedures may be consequently omitted. For example, if the downlink beam management procedure is omitted, then one or more operations illustrated in FIG. 8 as dotted lines for the downlink beam management procedure may be omitted. Similarly, if the uplink beam management procedure is omitted, then one or more operations illustrated in FIG. 8 as dashed lines for the uplink beam management procedure may be omitted.

In various aspects of a beam management procedure associated with downlink communication, the base station 802 may transmit a set of reference signals 822 that is received by the relay device 806 on the backhaul link 810 in the downlink in order for the relay device 806 to measure values indicative of strengths and/or qualities of downlink candidate beam pair links. Each one of the set of reference signals 822 may be, for example, a SS/PBCH block, a CSI-RS, another type of downlink reference (or synchronization) signal, or a combination of at least two reference signals. The base station 802 may transmit each of the set of reference signals 822 via a respective one of a set of TX beams generated at the base station 802.

Correspondingly, the relay device 806 may receive one or more reference signals of the set of reference signals 822 on the backhaul link 810. The relay device 806 may receive one or more reference signals of the set of reference signals 822 via at least one RX beam of a set of RX beams generated at the relay device 806.

Based on the one or more reference signals received from the transmitted set of reference signals 822, the relay device 806 may measure 824 each of a first set of measurements 826 associated with the set of candidate beam pairs, which may include each RX beam of the relay device 806 via which one of the reference signals 822 is received. Accordingly, each of the first set of measurements 826 may be indicative of link strength and/or quality on the backhaul link 810 for one candidate beam pair that includes the RX beam, via which a reference signal of the set of reference signals 822 is received, and a TX beam, via which that same reference signal is transmitted by the base station 802.

The relay device 806 may measure each of the first set of measurements 826 according to any suitable approach for measuring the strengths and/or qualities from received signals, and the relay device 806 may express each of the first set of measurements 826 in any suitable unit indicative of strengths and/or qualities measured from received signals. By way of example, the relay device 806 may measure each of the first set of measurements 826 as at least one of an RSRP, an RSRQ, an SNR, an SINR, an RSSI, and the like. Subsequently, the relay device 806 may transmit the first set of measurements 826 that is received by the base station 802 over the backhaul link 810.

In various aspects of a beam management procedure associated with uplink communication, some operations may be similar to those described in the context of a downlink beam management procedure but those operations may be transposed between the base station 802 and the relay device 806. In particular, the relay device 806 may transmit a set of reference signals 828 to the base station 802 in the uplink in order for the base station 802 to measure values indicative of link strengths and/or qualities for some or all uplink candidate beam pair links. Each of the set of reference signals 828 may be, for example, an SRS, another type of uplink reference (or synchronization) signal, or a combination of at least two reference signals. The relay device 806 may transmit each of the set of reference signals 828 via a respective one of a set of TX beams generated at the relay device 806.

Correspondingly, the base station 802 may receive one or more reference signals of the set of reference signals 828 via at least one RX beam of a set of RX beams generated at the base station 802. Based on the one or more reference signals received from the transmitted set of reference signals 828, the base station 802 may measure 830 each of a second set of measurements 832 associated with each of a respective set of candidate beam pairs. Accordingly, each of the second set of measurements 832 may be indicative of link strength and/or quality on the backhaul link 810 in the uplink for one candidate beam pair that includes the RX beam, via which one of the set of reference signals 828 is received, and a TX beam, via which that same one of the set of reference signals 828 is transmitted.

The base station 802 may measure 830 each of the second set of measurements 832 according to any suitable approach for measuring the strengths and/or qualities of received signals, and the base station 802 may express each of the second set of measurements 832 in any suitable unit indicative of strengths and/or qualities of beam pairs based on received signals. By way of example, the base station 802 may measure 830 each of the second set of measurements 832 as at least one of an RSRP, an RSRQ, a SNR, a SINR, a RSSI, and the like.

Following measurements 824, 830 performed by the relay device 806 and/or the base station 802 for downlink and/or uplink communication, the base station 802 may determine at least one set of measurements 826, 832 indicative of link strengths and/or qualities of one or more downlink and/or uplink candidate beam pairs on the backhaul link 810. In the downlink, for example, the base station 802 may determine the first set of measurements 826 indicative of link strengths and/or qualities of one or more downlink candidate beam pairs on the backhaul link 810 based on the first set of measurements 826 received from the relay device 806. In the uplink, however, the base station 802 may determine the second set of measurements 832 indicative of link strengths and/or qualities of one or more uplink candidate beam pairs on the backhaul link 810 by measuring 830 each of a second set of measurements 832 based on the set of reference signals 828 received from the relay device 806.

Based on at least one set of measurements 826, 832, the base station 802 may configure 833 at least one subset of a set of candidate beam pairs. The at least one subset of the set of candidate beam pairs may itself be a set of active beam pairs, each of which may be an active beam pair, a serving beam pair, and/or other communication beam pair. When configured, an active beam pair may be used to communicate on the backhaul link 810.

In one aspect, the base station 802 may configure 833 a subset of a set of candidate beam pairs for downlink communication, e.g., based on the first set of measurements 826 received from the relay device 806. In another aspect, the base station 802 may configure 833 a subset of a set of candidate beam pairs for uplink communication, e.g., based on the second set of measurements 832 measured by the base station 802 based on the set of reference signals 828 received from the relay device 806.

According to various aspects, the base station 802 may configure 833 at least one subset of the set of candidate beam pairs by comparing some or all of the measurements of one of the sets of measurements 826, 832 to one or more other measurements of that one of the sets of measurements 826, 832. The base station 802 may rank or order at least some of the set of candidate beam pairs based on the comparison. For example, the base station 802 may rank or order beam pairs of the set of candidate beam pairs according to the comparisons between some or all of the measurements of a respective one of the sets of measurements 826, 832, and therefore, ranking or ordering measurements of one of the sets of measurements 826, 832 may reflect the relative relationships between strengths and/or qualities of candidate beam pairs on the backhaul link 810, e.g., for downlink or for uplink.

In configuring 833 the at least one subset of the set of candidate beam pairs, the base station 802 may determine at least one beam pair associated with a satisfactory strength and/or quality of a link thereon. For example, the base station 802 may determine a beam pair associated with a respective "highest" or "best" measurement in the one of the sets of measurements 826, 832. The base station 802 may configure the at least one beam pair, determined to be associated with a satisfactory link strength and/or quality, as the active beam pair on which to communicate over the backhaul link.

The base station 802 may configure a first active beam pair of the subset of the set of candidate beam pairs for downlink communication over the backhaul link 810 based on the first set of measurements 826. Similarly, the base station 802 may configure a second active beam pair of the subset of the set of candidate beam pairs for uplink communication over the backhaul link 810 based on the second set of measurements 832. Potentially, the first and second active beam pairs may be the same or may share either a TX beam or an RX beam in common.

In some further aspects, the base station 802 may configure 833 at least one subset of the set of beam pairs by comparing each measurement of one of the sets of measurements 826, 832 to a third threshold associated with strengths and/or qualities of beam pair links (e.g., the third threshold may be the same or different for uplink and downlink communication). The third threshold may provide a floor or minimum acceptable strength and/or quality for beam pair links, e.g., such that beam pair links below the floor are determined to be insufficient to carry communication on the backhaul link 810. Thus, measurements of a respective one of the sets of measurements 826, 832 failing to satisfy (e.g., meet or exceed) the third threshold may be excluded from a list of candidate beam pairs. According to some aspects, then, any beam pair associated with a measurement of a respective one of the sets of measurements 826, 832 may be acceptable for use, and therefore, a beam pair associated with a "highest" or "best" measurement in the one of the sets of measurements 826, 832 may not necessarily be the default configuration implemented by the base station 802 on the backhaul link 810.

Following configuration of the at least one subset of the set of candidate beam pairs, the base station 802 may transmit beamforming configuration information 834 that is received by the relay device 806. The beamforming configuration information 834 may indicate the at least one subset of the set of candidate beam pairs to be used for communication on the backhaul link 810. For example, the beamforming configuration information 834 may indicate one or more beam indexes corresponding to one or more beams, each of which may be one half of an active beam pair included in the at least one subset of the set of candidate beam pairs. The other half of each of the beam pairs may be a beam to be applied by the base station 802 in order to establish the link on the active beam pair over the backhaul link 810.

Subsequently, the base station 802 and the relay device 806 may communicate control information 854 associated with the relay device 806 on the backhaul link 810 via an active beam pair of the subset of the set of candidate beam pairs. To do so, the base station 802 and the relay device 806 may apply their respective individual beams of the active beam pair configured for the backhaul link 810, as indicated by the beamforming configuration information 834.

According to one example of downlink communication, a downlink active beam pair of the subset of the set of candidate beam pairs indicated by the beamforming configuration information 834 may include a TX beam at the base station 802 and a complementary RX beam at the relay device 806. The base station 802 may generate the TX beam of the downlink active beam pair and, correspondingly, the relay device 806 may generate the RX beam of the downlink active beam pair, as configured according to the beamforming configuration information 834.

The base station 802 may then transmit, via the TX beam of the downlink active beam pair, the control information 854 on the backhaul link 810. Complementary thereto, the relay device 806 may receive, via the RX beam of the downlink active beam pair, the control information 854 on the backhaul link 810.

According to one example of uplink communication, an uplink active beam pair of the subset of the set of candidate beam pairs indicated by the beamforming configuration information 834 may include a TX beam at the relay device 806 and a complementary RX beam at the base station 802. The relay device 806 may generate the TX beam of the uplink active beam pair, as configured according to the beamforming configuration information 834, while the base station 802 may generate the RX beam of the uplink active beam pair.

The relay device 806 may then transmit, via the TX beam of the uplink active beam pair, the control information 854 on the backhaul link 810. Complementary thereto, the base station 802 may receive, via the RX beam of the uplink active beam pair, the control information 854 on the backhaul link 810.

When a UE 804 connects with the base station 802 through the relay device 806, the base station 802 may transmit wideband analog signaling 836, including at least one wideband analog signal, to the UE 804 through the relay device 806. According to various aspects, the wideband analog signaling 836 may include data and/or control information for at least the UE 804. Potentially, the base station 802 may transmit the wideband analog signaling 836 to a plurality of UEs, including the UE 804, through the relay device 806.

When the UE 804 first connects with the base station 802, the access link 812 may be unestablished. The wideband analog signaling 836 may be associated with the access link 812 and, specifically, establishment of the access link 812. Referring to FIG. 5, for example, the access link 512 may be established as part of the access link-related procedures 524, such as during the initial access procedure 540 or the radio link and/or radio resource management procedure 542. In establishing the access link 512, the base station 502 may configure a set of subcarriers for the access link 512. The set of subcarriers on which the access link 512 is configured may partially or completely overlap with the set of subcarriers on which the backhaul link 510 is configured, or the respective sets of subcarriers on which the backhaul and access links 510, 512 are configured may be entirely discrete.

Again with reference to FIG. 8, the base station 802 may eventually configure communication with the UE 804 over the access link 812 on one or more beam pairs according to a beam management procedure (e.g., according to beam refinement or other beam training). However, at least one active beam pair associated with the access link 812 may not yet be configured, e.g., at some earlier stage(s) of access link-related procedures 524 illustrated in FIG. 5, supra.

Thus, the base station 802 may transmit the wideband analog signaling 836 via the beam pair configured for the backhaul link 810. As the backhaul link 810 may be configured on different subcarriers than the access link 812, the beam pair configured for downlink communication on the backhaul link 810 may be suboptimal for communication on the access link 812. However, the channel conditions may be sufficiently similar and/or the sets of subcarriers may be sufficiently proximate between the backhaul link 810 and the access link 812 such that the downlink beam pair configured for the backhaul link 810 may have sufficient strength and/or quality on the access link 812, e.g., for some minimal signaling associated with as link establishment.

For the access link 812, the base station 802 may perform end-to-end (E2E) beam management to configure one or more beam pairs on which the base station 802 and the relay device 806 communicate and/or on which the relay device 806 and the UE 804 communicate. Specifically, the base station 802 may configure one or more of a first beam pair for the backhaul link 810, a second beam pair for the first relay access link 812a, and a third beam pair for the second relay access link between the relay device and the at least one UE.

In E2E beam management, reference signals communicated by the base station 802 and the UE 804 may be forwarded by the relay device 806. Thus, the beam pairs on which the backhaul and access links 810, 812 are configured may be trained and/or refined for the UEs served by the base station 802 through the relay device 806.

For E2E beam management on the downlink, the base station 802 may transmit a set of reference signals 838 that is received by the UE 804 on the access link 812 through the relay device 806. The base station 802 may transmit the set of reference signals 838 to the UE 804 on the access link 812 in the downlink in order for the UE 804 to measure values indicative of the link strengths and/or qualities of beam pairs available to have the access link 812 configured on. Each one of the set of reference signals 838 may be, for example, a SS/PBCH block, a CSI-RS, another type of downlink reference (or synchronization) signal, or a combination of at least two reference signals. The base station 802 may transmit each of the set of reference signals 838 via a respective one of a set of TX beams generated at the base station 802.

The relay device 806 may receive each of the set of reference signals 838 from the base station 802 at an RX antenna, and may forward each of the reference signals 838 as an analog signal at a corresponding TX antennas. As relayed on the access link 812, the UE 804 may receive one or more reference signals of the set of reference signals 838. The UE 804 may receive one or more reference signals of the set of reference signals 838 via at least one RX beam of a set of RX beams.

Based on the one or more reference signals received from the transmitted set of reference signals 838, the UE 804 may measure 840 each of a third set of measurements 842 associated with the set of candidate beam pairs. Accordingly, each of the third set of measurements 842 may be indicative of link strength and/or quality on the access link 812 for one candidate beam pair that includes the RX beam, via which a reference signal of the set of reference signals 838 is received, and a TX beam, via which that same reference signal is relayed by the relay device 806 from the base station 802.

The UE 804 may measure 840 each of the third set of measurements 842 according to any suitable approach for measuring the strengths and/or qualities from received signals, and the UE 804 may express each of the set of measurements in any suitable unit indicative of strengths and/or qualities measured from received signals. By way of example, the UE 804 may measure each of the third set of measurements 842 as at least one of an RSRP, an RSRQ, an SNR, an SINR, an RSSI, and the like.

Subsequently, the UE 804 may transmit the third set of measurements 842, that is received by the base station 802, over the access link 812. In one aspect, the UE 804 may transmit the third set of measurements 842 to the base station 802 through the relay device 806 in the mmW/near-mmW network. However, the UE 804 may establish another link with the base station 802 in a relatively lower frequency region (e.g., a sub-6 GHz or sub-7 GHz network, such as FR1 of 5G NR). The UE 804 may transmit the third set of measurements 842 to the base station 802 in the lower frequency region, bypassing the relay device 806.

In various aspects of a beam management procedure associated with uplink communication, some operations may be similar to those described in the context of a downlink beam management procedure but those operations may be transposed between the base station 802 and the UE 804. In particular, the UE 804 may transmit a set of reference signals 844 that is received by the base station 802 in the uplink in order for the base station 802 to measure values indicative of link strengths and/or qualities for some or all uplink candidate beam pair links. In the uplink, each of the set of reference signals 844 may be relayed to the base station 802 by the relay device 806.

Each of the set of reference signals 844 may be, for example, an SRS, another type of uplink reference (or synchronization) signal, or a combination of at least two reference signals. The UE 804 may transmit each of the set of reference signals 844 via a respective one of a set of TX beams generated at the UE 804.

Correspondingly, the relay device 806 may receive one or more reference signals of the set of reference signals 844 via at least one RX beam of a set of RX beams generated at the relay device 806. The relay device 806 may then forward one or more of the reference signals 844, received via one RX beam of the relay device 806, as analog signals via a corresponding TX beam of the relay device 806. The base station 802 may receive one or more reference signals received from the set of reference signals 844 and, based thereon, the base station 802 may measure 846 each of a fourth set of measurements 848 associated with each of a respective set of candidate beam pairs. Accordingly, each of the fourth set of measurements 848 may be indicative of link strength and/or quality on the access link 812 in the uplink for one candidate beam pair that includes the RX beam, via which one of the set of reference signals 844 is received, and a TX beam, via which that same one of the set of reference signals 844 is transmitted. In some aspects, the base station 802 may measure 846 one or more of the fourth set of measurements 848 as indicative of link strength and/or quality on the access link 812 in the uplink for one candidate beam pair that includes the RX beam of the relay device 806 and a TX beam of the UE 804.

The base station 802 may measure 846 each of the fourth set of measurements 848 according to any suitable approach for measuring the strengths and/or qualities of received signals, and the base station 802 may express each of the fourth set of measurements 848 in any suitable unit indicative of strengths and/or qualities of beam pairs based on received signals. By way of example, the base station 802 may measure 846 each of the fourth set of measurements 848 as at least one of an RSRP, an RSRQ, a SNR, a SINR, a RSSI, and the like.

Following measurements 840, 846 performed by the relay device 806 and/or the base station 802 for downlink and/or uplink communication, the base station 802 may determine at least one set of measurements 842, 848 indicative of link strengths and/or qualities of one or more downlink and/or uplink candidate beam pairs on the access link 812. In the downlink, for example, the base station 802 may determine the third set of measurements 842 indicative of link strengths and/or qualities of one or more downlink candidate beam pairs on the access link 812 based on the third set of measurements 842 received from the UE 804 and based on the relay device 806 that the access link 812 traverses.

In the uplink, however, the base station 802 may determine the fourth set of measurements 848 indicative of link strengths and/or qualities of one or more uplink candidate beam pairs on the access link 812 by measuring 846 each of the fourth set of measurements 848 based on a set of reference signals 844 received from the UE 804, the set of reference signals 844 having been relayed by the relay device 806 on the access link 812.

Based on at least one set of measurements 842, 848, the base station 802 may configure 850 at least one subset of a set of candidate beam pairs. The at least one subset of the set of candidate beam pairs may itself be a set of active beam pairs, each of which may be an active beam pair, a serving beam pair, and/or other communication beam pair. When configured, an active beam pair may be used to communicate on the access link 812.

In one aspect, the base station 802 may configure 850 a subset of a set of candidate beam pairs for downlink communication, e.g., based on the third set of measurements 842 received from the UE 804. For example, the base station 802 may configure 850 a subset of a set of candidate beam pairs for downlink communication on the first relay access link 812a between the base station 802 and the relay device 806 based on the third set of measurements 842 received from the UE 804. In some further aspects, the base station 802 may configure 850 a subset of a set of candidate beam pairs for downlink communication on the second relay access link 812b between relay device 806 and the UE 804 based on the third set of measurements 842 received from the UE 804.

In another aspect, the base station 802 may configure a subset of a set of candidate beam pairs for uplink communication, e.g., based on the fourth set of measurements 848 measured by the base station 802 based on the set of reference signals 844 received from the UE 804 and relayed by the relay device 806. For example, the base station 802 may configure 850 a subset of a set of candidate beam pairs for uplink communication on the first relay access link 812a between the base station 802 and the relay device 806 based on the fourth set of measurements 848 measured by the base station 802. In some further aspects, the base station 802 may configure 850 a subset of a set of candidate beam pairs for uplink communication on the second relay access link 812b between relay device 806 and the UE 804 based on the fourth set of measurements 848 measured by the base station 802.

In some aspects, the base station 802 may configure 850 the subset of the set of candidate beams based on sets of measurements from multiple UEs. For example, the base station 802 may configure the subset of the set of candidate beams for the relay device 806 based on multiple sets of measurements received from multiple UEs based on at least one set of reference signals 838 relayed through the relay device 806.

In another aspect, the base station 802 may configure 850 the subset of the set of candidate beams for a respective one of multiple UEs based on at least one of the sets of measurements 842, 848 associated with one UE 804. For example, the base station 802 may configure the subset of the set of candidate beams communication with multiple UEs served through the relay device 806 based on at least one of the sets of measurements 842, 848 associated with one UE 804 served through the relay device 806.

According to various aspects, the base station 802 may configure 850 at least one subset of the set of candidate beam pairs by comparing some or all of the measurements of one of the sets of measurements 842, 848 to one or more other measurements of that one of the sets of measurements 842, 848. The base station 802 may rank or order at least some of the set of candidate beam pairs based on the comparison. For example, the base station 802 may rank or order beam pairs of the set of candidate beam pairs according to the comparisons between some or all of the measurements of a respective one of the sets of measurements 842, 848, and therefore, ranking or ordering measurements of one of the sets of measurements 826, 832 may reflect the relative relationships between strengths and/or qualities of candidate beam pairs on the backhaul link 810, e.g., for downlink or for uplink.

In configuring 850 the at least one subset of the set of candidate beam pairs, the base station 802 may determine at least one beam pair associated with a satisfactory strength and/or quality of a link thereon. For example, the base station 802 may determine a beam pair associated with a respective "highest" or "best" measurement in the one of the sets of measurements 842, 848. The base station 802 may configure the at least one beam pair, determined to be associated with a satisfactory link strength and/or quality, as the active beam pair on which to communicate over the access link 812.

The base station 802 may configure a first active beam pair of the subset of the set of candidate beam pairs for downlink communication over the access link 812 based on the third set of measurements 842 received from the UE 804. Similarly, the base station 802 may configure a second active beam pair of the subset of the set of candidate beam pairs for uplink communication over the access link 812 based on the fourth set of measurements 848. Potentially, the first and second active beam pairs may be the same or may share either a TX beam or an RX beam in common.

In some aspects, the base station 802 may configure 850 a candidate beam pair to include a TX beam or an RX beam of the relay device 806 on the access link 812. As the beamformed ones of the sets of reference signals 838, 844 are relayed between the base station 802 and the UE 804 on the access link 812, a beam pair link may include one TX or RX beam of the UE 804 and a corresponding other one of a TX beam or RX beam of the relay device 806. Further, the base station 802 may configure at least one beam pair on the access link 812 between the base station 802 and the UE 804, which may include one TX or RX beam of the base station 802 and a corresponding other one of a TX beam or RX beam of the relay device 806.

Following configuration of the at least one subset of the set of candidate beam pairs, the base station 802 may transmit beamforming configuration information 852 to the relay device 806. The beamforming configuration information 852 may indicate the at least one subset of the set of candidate beam pairs to be used for communication on the access link 812. For example, the beamforming configuration information 852 may indicate one or more beam indexes corresponding to one or more beams, each of which may be one half of an active beam pair included in the at least one subset of the set of candidate beam pairs. The other half of each of the beam pairs may be a beam to be applied by the base station 802 in order to communicate via the active beam pair over the access link 812.

The relay device 806 may transmit the beamforming configuration information 852 to the UE 804. The beamforming configuration information 852 may indicate the at least one subset of the set of candidate beam pairs to be used for communication on the access link 812 between the UE 804 and the relay device 806. For example, the beamforming configuration information 852 may indicate one or more beam indexes corresponding to one or more beams, each of which may be one TX or RX half of an active beam pair to be applied by the relay device 806. The other TX or RX half of each of the beam pairs may be a beam to be applied by the UE 804 in order to communicate via the active beam pair over the access link 812.

Subsequently, the base station 802 may communicate data/control information 856 associated with the UE 804 through the relay device 806 on the access link 812 via an active beam pair of the subset of the set of candidate beam pairs. To do so, the base station 802 and the relay device 806 may apply their respective individual beams of the active beam pair configured for the access link 812, as indicated by the beamforming configuration information 852.

According to one example of downlink communication, a downlink active beam pair of the subset of the set of candidate beam pairs indicated by the beamforming configuration information 852 may include a TX beam at the base station 802 and a complementary RX beam at the relay device 806. The base station 802 may generate the TX beam of the downlink active beam pair and, correspondingly, the relay device 806 may generate the RX beam of the downlink active beam pair, as configured according to the beamforming configuration information 852. The base station 802 may then transmit, via the TX beam of the downlink active beam pair, the data/control information 856 on the access link 812. Complementary thereto, the relay device 806 may receive, via the RX beam of the downlink active beam pair, the data/control information 856 on the access link 812.

Further, the relay device 806 may generate the TX beam of a downlink active beam pair and, correspondingly, the UE 804 may generate the RX beam of the downlink active beam pair, as configured according to the beamforming configuration information 852. The relay device 806 may then forward, via the TX beam of the downlink active beam pair, analog signals carrying the data/control information 856 on the access link 812. Complementary thereto, the UE 804 may receive, via the RX beam of the downlink active beam pair, the data/control information 856 on the access link 812.

According to one example of uplink communication, an uplink active beam pair of the subset of the set of candidate beam pairs indicated by the beamforming configuration information 852 may include a TX beam at the UE 804 and a complementary RX beam at the relay device 806. The UE 804 may generate the TX beam of the uplink active beam pair, as configured according to the beamforming configuration information 852, while the relay device 806 may generate the RX beam of the uplink active beam pair. The UE 804 may then transmit, via the TX beam of the uplink active beam pair, the data/control information 856 on the access link 812. Complementary thereto, the relay device 806 may receive, via the RX beam of the uplink active beam pair, the data/control information 856 on the access link 812.

Further, the relay device 806 may generate the TX beam of an uplink active beam pair on the first relay access link 812a and, correspondingly, the base station 802 may generate the RX beam of the uplink active beam pair. The relay device 806 may then forward, via the TX beam of the uplink active beam pair, analog signals carrying the data/control information 856 on the access link 812. Complementary thereto, the base station 802 may receive, via the RX beam of the uplink active beam pair, the data/control information 856 on the access link 812.

Figure 9:
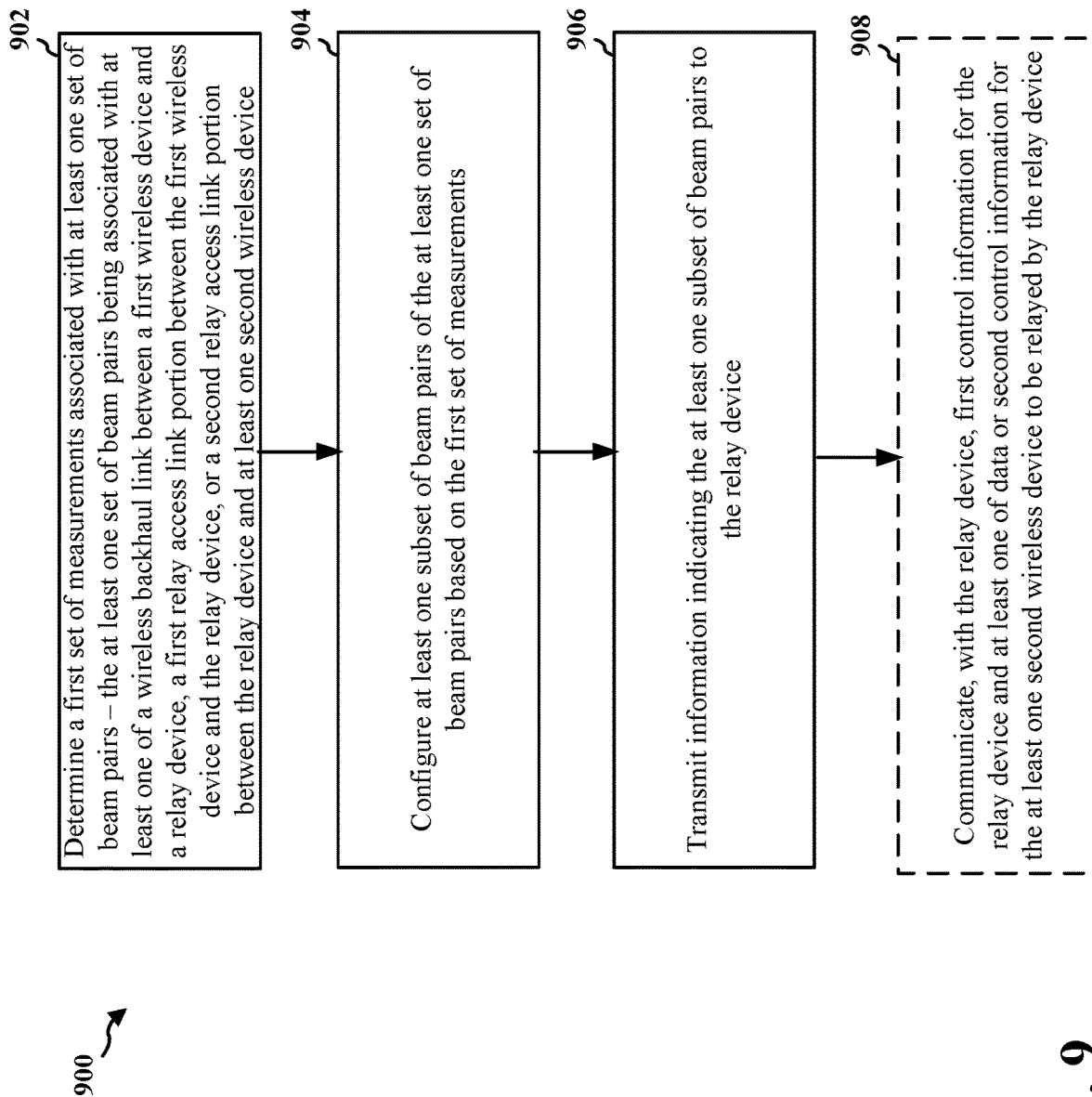
FIG. 9 is a flowchart of a method of wireless communication at a control node, in accordance with the teachings disclosed herein.

FIG. 9 is a flowchart 900 of a method of wireless communication. The method may be performed by a base station (e.g., the base station 102/180, the base station 310, the base station 402, the base station 502, the base station 702, and/or the base station 802; the apparatus 1002) or a control node or a control interface (e.g., the control node 403, the control interface 503, the control interface 703, and/or the control interface 803). Optional aspects are illustrated with a dashed line.

At 902, the control node determines a first set of measurements associated with at least one set of beam pairs, as described in connection with the sets of measurements 730, 732 of FIG. 7, and/or the sets of measurements 826, 832 of FIG. 8. For example, the determining of the first set of measurements may be performed by an example measurements component 1040 of the apparatus 1002 of FIG. 10. In some examples, the at least one set of beam pairs may be associated with at least one of a wireless backhaul link between a first wireless device and a relay device, a first relay access link portion between the first wireless device and the relay device, or a second relay access link between the relay device and at least one UE.

In one aspect, the first set of measurements may be associated with a respective one of a set of BWPs of an available system bandwidth. Each of the set of bandwidth parts may be associated with the first control information for the relay device at a corresponding interval of a set of intervals. The control node may configure the set of BWPs for the first control information. Each of the set of BWPs may be active for the first control information at the respective interval of the set of intervals.

In one aspect, the control node may determine the first set of measurements associated with the at least one set of beam pairs by at least one receiving the first set of measurements from the relay device based on a first set of reference signals transmitted to the relay device, and/or measuring each of the first set of measurements based on a second set of reference signals received from the relay device. For example, referring to 902 in the context of FIG. 7, the base station 702 (and/or the control interface 703) may determine a set of measurements by receiving the set of measurements 730 from the relay device 706 for each of intervals 610a-f on a corresponding one of the narrowband BWPs 604a-f. Additionally or alternatively, the base station 702 may determine a set of measurements 732 based on a set of reference signals 736 received from the relay device 706 for each of intervals 610a-f on a corresponding one of the narrowband BWPs 604a-f.

In another aspect, the control node may determine the first set of measurements associated with the at least one set of beam pairs by at least one of receiving the first set of measurements relayed from the at least one second wireless device by the relay device based on a first set of reference signals relayed to the at least one second wireless device by the relay device and/or by measuring each of the first set of measurements based on a second set of reference signals relayed from the at least one second wireless device by the relay device. For example, referring to 902 in the context of FIG. 8 on the backhaul link 810, the base station 802 may determine at least one set of measurements 826, 832 associated with the backhaul link 810 by receiving the first set of measurements 826 from the relay device 806 based on the set of reference signals 822 on the backhaul link 810. Additionally or alternatively, the base station 802 may determine the second set of measurements 832 based on a set of reference signals 828 received from the relay device 806 on the backhaul link 810.

For example, referring to 902 in the context of FIG. 8 on the access link 812, the base station 802 may determine at least one set of measurements 842, 848 associated with the access link 812 by receiving the third set of measurements 842 from the UE 804 based on the set of reference signals 838 on the access link 812. Additionally or alternatively, the base station 802 may determine the fourth set of measurements 848 based on a set of reference signals 844 received from the UE 804 on the access link 812.

At 904, the control node configures at least one subset of beam pairs of the at least one set of beam pairs based on the first set of measurements, as described in connection with 738 of FIG. 7 and/or 833 of FIG. 8. For example, the configuring of the at least one subset of beam pairs of the at least one set of beam pairs may be performed by an example configuration component 1042 of the apparatus 1002 of FIG. 10.

In one aspect, the control node may configure at least one subset of beam pairs based on the first set of measurements by configuring a first subset of the set of beam pairs for the wireless backhaul link based on the first set of measurements. Each of the first subset of the set of beam pairs may be associated with a respective one of the set of BWPs at a corresponding interval of the set of intervals. Additionally or alternatively, the control node may configure a second subset of the set of beam pairs for the first relay access link portion based on the first set of measurements. Each of the second subset of the set of beam pairs may be used for at least one of data or second control information carried on a wideband of the available system bandwidth excluding the respective one of the set BWPs at a corresponding interval of the set of intervals. For example, referring to 904 in the context of FIG. 7, the base station 702 (and/or the control interface 703) may configure 738 at least one subset of beam pairs of the at least one set of beam pairs based on at least one of the sets of measurements 730, 732. The base station 702 (and/or the control interface 703) may configure an active beam pair for each of the intervals 610*a*-*f* at a corresponding one of the intervals 610*a*-*f*.

In another aspect, the control node may configure the at least one subset of the set of beam pairs based on the first set of measurements by at least one of configuring a first beam pair of the at least one subset of beam pairs for the wireless backhaul link between the first wireless device and the relay device, configuring a second beam pair of the at least one subset of beam pairs for the first relay access link portion between the first wireless device and the relay device, and/or configuring a third beam pair of the at least one subset of beam pairs for the second relay access link portion between the relay device and the at least one second wireless device. For example, referring to 904 in the context of FIG. 8, the base station 802 (and/or the control interface 803) may configure the at least one subset of the set of beam pairs based on at least one of the sets of measurements 826, 832, 842, 848. The base station 802 (and/or the control interface 803) may configure 833 at least one subset of the set of beam pairs for the backhaul link 810 based on at least one of the sets of measurements 826, 832 associated with the relay device 806 on the backhaul link 810. The base station 802 may configure 850 at least one subset of the set of beam pairs for the access link based on at least one of the sets of measurements 842, 848 associated with the UE 804 on the access link 812.

At 906, the control node transmits information indicating the at least one subset of beam pairs to the relay device, as described in connection with the beamforming configuration information 740 of FIG. 7 and/or the beamforming configuration information 834, 852 of FIG. 8. For example, the transmitting of the information indicating the at least one subset of beam pairs to the relay device may be performed by an example information transmission component 1044 of the apparatus 1002 of FIG. 10.

In one aspect, the information indicating the at least one subset of beam pairs may indicate a respective beam pair corresponding to each of the intervals to be applied at a respective one of the active narrowband BWPs. For example, referring to 906 in the context of FIG. 7, the base station 702 may transmit the beamforming configuration information 740 to the relay device 706, and the beamforming configuration information may indicate a respective beam pair corresponding to each of the intervals 610*a*-*f* to be applied at a respective one of the active narrowband BWPs 604*a*-*f*.

In another aspect, the control node may transmit information indicating the at least one subset of beam pairs to the relay device in order to indicate at least one beam pair to be applied for one or more of downlink communication on the backhaul link, uplink communication on the backhaul link, downlink communication on the access link between the first wireless device and the relay device, uplink communication on the access link between the first wireless device and the relay device, downlink communication on the access link between the relay device and at least one second wireless device, and/or uplink communication on the access link between the relay device and the at least one second wireless device. For example, referring to 906 in the context of FIG. 8, the base station 802 may transmit at least one beamforming configuration information 834, 852 to the relay device 806. The relay device 806 may forward at least a portion of the beamforming configuration information 852 to the UE 804.

At 908, the control node may facilitate communication, with the relay device, first control information for the relay device and the at least one of data or second control information for the at least one second wireless device to be relayed by the relay device, as described in connection with the control information 742 and/or the data/control information 744 of FIG. 7, and/or the control information 854 and/or the data/control information 856 of FIG. 8. For example, the communicating of the first control information for the relay device and the at least one of data or second control information for the at least one second wireless device to be relayed by the relay device may be performed by an example communication component 1046 of the apparatus 1002 of FIG. 10.

In some examples, the control node may facilitate the first wireless device to communicate the first control information and the at least one of data and/or second control information according to the information indicating the at least one subset of beam pairs. For example, referring to 908 in the context of FIG. 7, the base station 702 may communicate the control information 742 and the data/control information 744 with the relay device 706 in each of the respective narrowband BWPs 604*a*-*f* during a corresponding one of the intervals 610*a*-*f*. The relay device 706 may forward the data/control information 744 between the base station 702 and the UE 704.

In some examples, and referring to 908 in the context of FIG. 8, the base station 802 may communicate the control information 854 and the data/control information 856 with the relay device 806. The relay device 806 may forward the data/control information 856 between the base station 802 and the UE 804.

Figure 10:
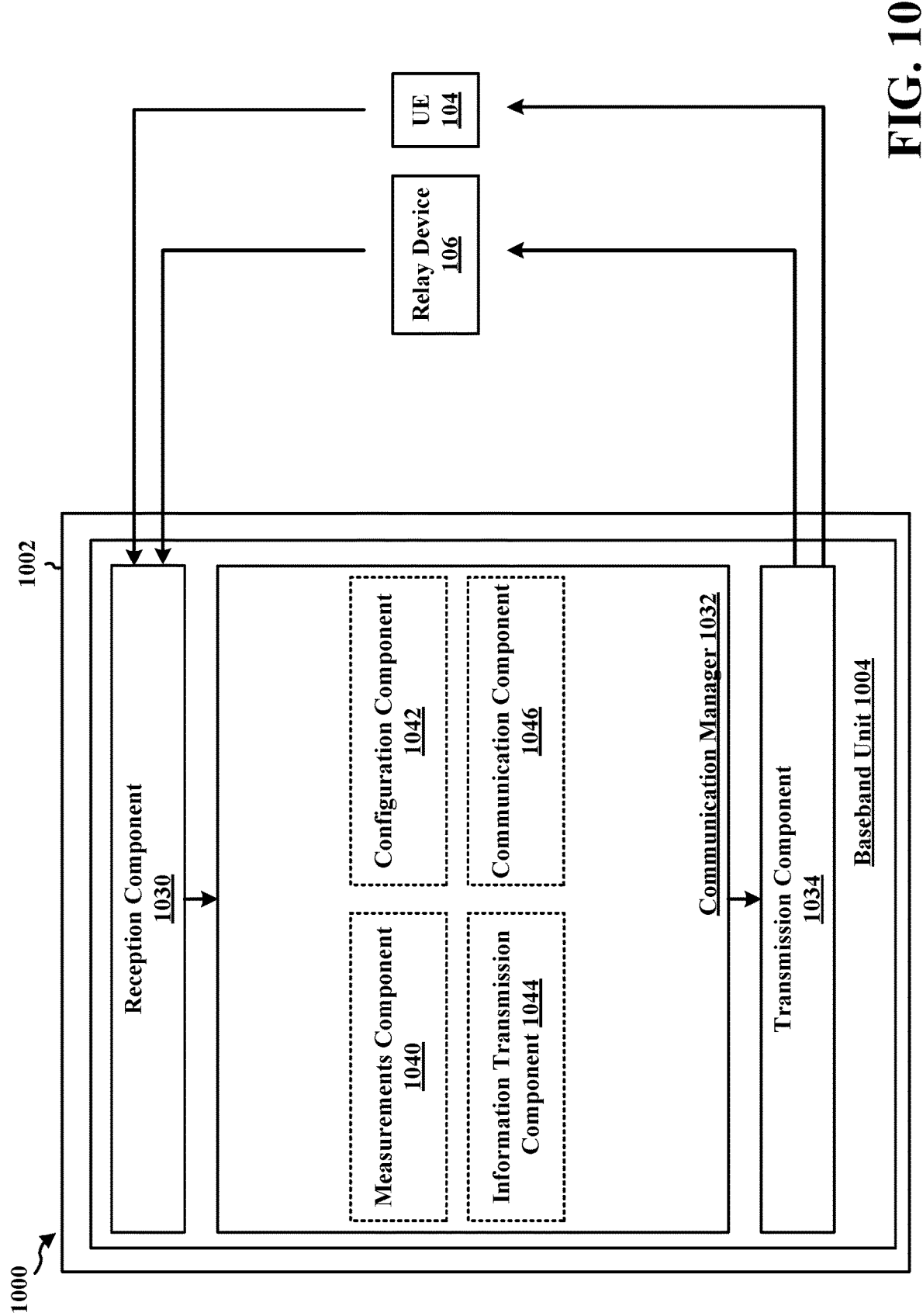
FIG. 10 is a diagram illustrating an example of a hardware implementation for an example apparatus, in accordance with the teachings disclosed herein.

FIG. 10 is a diagram 1000 illustrating an example of a hardware implementation for an apparatus 1002. The apparatus 1002 is a base station and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a measurements component 1040 that facilitates determining a first set of measurements associated with at least one set of beams, e.g., as described in connection with 902 of FIG. 9. The communication manager 1032 further includes a configuration component 1042 that facilitates configuring at least one subset of beam pairs of the at least one set of beam pairs based on the first set of measurements, e.g., as described in connection with 904 of FIG. 9. The communication manager 1032 further includes an information transmission component 1044 that facilitates transmitting information indicating the at least one subset of beam pairs to the relay device, e.g., as described in connection with 906 of FIG. 9. The communication manager 1032 further includes a communication component 1046 that facilitates communicating first control information for the relay device and at least one of data or second control information for the at least one second wireless device to be relayed by the relay device, e.g., as described in connection with 908 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for determining a first set of measurements associated with at least one set of beam pairs, where the at least one set of beam pairs is associated with at least one of a wireless backhaul link between a first wireless device and a relay device, a first relay access link portion between the first wireless device and the relay device, or a second relay access link portion between the relay device and at least one second wireless device. The example apparatus 1002 may also include means for configuring at least one subset of beam pairs of the at least one set of beam pairs based on the first set of measurements. The example apparatus 1002 may also include means for transmitting information indicating the at least one subset of beam pairs to the relay device. The example apparatus 1002 may also include means for communicating, with the relay device, first control information for the relay device and at least one of data or second control information for the at least one second wireless device to be relayed by the relay device. The example apparatus 1002 may also include means for configuring the set of bandwidth parts for the first control information, and where each of the set of bandwidth parts is active for the first control information at the respective interval of the set of intervals. The example apparatus 1002 may also include means for receiving the first set of measurements from the relay device based on a first set of reference signals transmitted to the relay device to determine the first set of measurements associated with the at least one set of beam pairs. The example apparatus 1002 may also include means for measuring each of the first set of measurements based on a second set of reference signals received from the relay device to determine the first set of measurements associated with the at least one set of beam pairs. The example apparatus 1002 may also include means for configuring a first subset of the set of beam pairs for the wireless backhaul link based on the first set of measurements, and where each of the first subset of the set of beam pairs is associated with a respective one of the set of bandwidth parts at the corresponding interval of the set of intervals. The example apparatus 1002 may also include means for configuring a second subset of the set of beam pairs for the first relay access link portion based on the first set of measurements, and where each of the second subset of the set of beam pairs is to be used for the at least one of data or second control information carried on a wideband of the available system bandwidth excluding the respective one of the set of bandwidth parts at the corresponding interval of the set of intervals. The example apparatus 1002 may also include means for receiving the first set of measurements from the at least one second wireless device based on a first set of reference signals relayed to the at least one second wireless device by the relay device to determine the first set of measurements associated with the at least one set of beam pairs. The example apparatus 1002 may also include means for measuring each of the first set of measurements based on a second set of reference signals relayed from the at least one second wireless device by the relay device to determine the first set of measurements associated with the at least one set of beam pairs. The example apparatus 1002 may also include means for configuring a first beam pair of the at least one subset of beam pairs for the wireless backhaul link between the first wireless device and the relay device to configure the at least one subset of beams pairs based on the first set of measurements. The example apparatus 1002 may also include means for configuring a second beam pair of the at least one subset of beam pairs for the first relay access link portion between the first wireless device and the relay device to configure the at least one subset of beams pairs based on the first set of measurements. The example apparatus 1002 may also include means for configuring a third beam pair of the at least one subset of beam pairs for the second relay access link portion between the relay device and the at least one second wireless device to configure the at least one subset of beams pairs based on the first set of measurements.

The aforementioned means may be one or more of the aforementioned components of the apparatus 1002 configured to perform the functions recited by the aforementioned means. As described supra, the apparatus 1002 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 11:
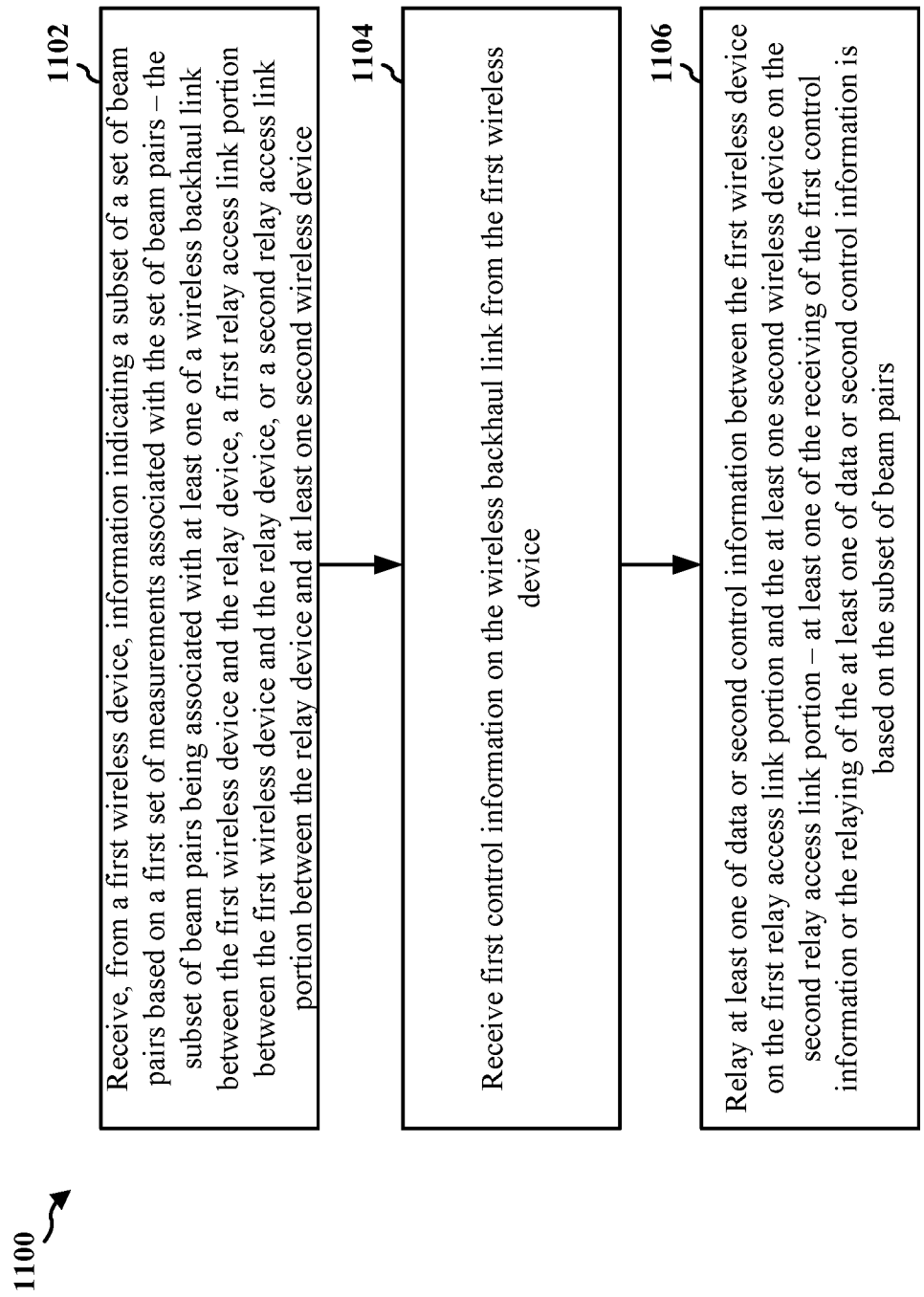
FIG. 11 is a flowchart of a method of wireless communication at a relay device, in accordance with the teachings disclosed herein.

FIG. 11 is a flowchart 1100 of a method of wireless communication. The method may be performed by a relay device (e.g., the relay device 106, one of the relay devices 406a-c, the relay device 506, the relay device 706, and/or the relay device 806; the apparatus 1202). Optional aspects are illustrated with a dashed line.

At 1102, the relay device receives, from a first wireless device, information indicating a subset of a set of beam pairs based on a first set of measurements associated with the set of beam pairs, as described in connection with the beamforming configuration information 740 of FIG. 7, and/or the beamforming configuration information 834, 852 of FIG. 8. For example, the receiving of the information indicating a subset of a set of beam pairs based on a first set of measurements associated with the set of beam pairs may be performed by an example beam pairs component 1240 of the apparatus 1202 of FIG. 12. In some examples, the subset of beam pairs may be associated with at least one of a wireless backhaul link between the first wireless device and the relay device, a first relay access link portion between the first wireless device and the relay device, or a second relay access link portion between the relay device and at least one second wireless device.

In one aspect, each of the first set of measurements may be associated with a respective one of a set of BWPs of an available system bandwidth, and each of the set of BWPs may be associated with first control information on the wireless backhaul link at a corresponding interval of a set of intervals. The relay device may receive, from the first wireless device, information indicating the set of BWPs for the first control information, and each of the set of BWPs may be active for the first control information at a respective intervals of the set of intervals. The information indicating the subset of beam pairs may include a second subset of beam pairs for the first relay access link portion, and each of the second subset of the set of beam pairs may be used for at least one of data or second control information carried on a wideband of the available system bandwidth excluding the respective one of the set of BWPs at the corresponding intervals of the set of intervals.

Further, the relay device may receive a set of reference signals from the first wireless device. The relay device may measure each of the first set of measurements based on the received set of reference signals, and the relay device may transmit the first set of measurements to the first wireless device. Alternatively, the relay device may transmit a set of reference signals to the first wireless device for measurement of each of the first set of measurements by the first wireless device. For example, referring to 1102 in the context of FIG. 7, the relay device 706 may receive, from the base station 702, the beamforming configuration information 740 based on at least one of the sets of measurements 730, 732 associated with a set of beam pairs.

In another aspect, the relay device may relay a set of reference signals between the first wireless device and at least one second wireless device. The first set of measurements may be based on the set of reference signals, and the subset of beam pairs may include a first beam pair associated with the first relay access link portion and a second beam pair associated with the second relay access link portion. Additionally or alternatively, the first set of measurements may be based on a set of reference signals received from the first wireless device, and the subset of beam pairs may include a first beam pair associated with the downlink communication on the wireless backhaul link. Additionally or alternatively, the first set of measurements may be based on a set of reference signals transmitted to the first wireless device, and the subset of beam pairs may include a first beam pair associated with uplink communication on the wireless backhaul link.

For example, referring to 1102 in the context of FIG. 8, the relay device 806 may receive, from the base station 802, at least one of the beamforming configuration information 834, 852 based on at least one of the sets of measurements 826, 832, 842, 848 associated with a set of beam pairs.

At 1104, the relay device receives first control information on the wireless backhaul link from the first wireless device, as described in connection with the control information 742 of FIG. 7, and/or the control information 854 of FIG. 8. For example, the receiving of the first control information on the wireless backhaul link from the first wireless device may be performed by an example control information component 1242 of the apparatus 1202 of FIG. 12.

In some examples, and referring to 1104 in the context of FIG. 7, the relay device 706 may receive the control information 742 on the backhaul link 710 during each of the intervals 610*a-f* at a corresponding one of the active narrowband BWPs 604*a-f*. In some examples, and referring to 1104 in the context of FIG. 8, the relay device 806 may receive the control information 854 on the backhaul link 810 from the base station 802.

At 1106, the relay device relays at least one of data or second control information between the first wireless device on the first relay access link portion and the at least one second wireless device on the second relay access link portion, as described in connection with the data/control information 744 of FIG. 7, and/or data/control information 856 of FIG. 8. For example, the relaying of the at least one of data or second control information between the first wireless device on the first relay access link portion and the at least one second wireless device on the second relay access link portion may be performed by an example relaying component 1244 of the apparatus 1202 of FIG. 12. In some examples, at least one of the reception of the first control information and/or the relay of the at least one of data and/or second control information may be based on the subset of beam pairs.

In some examples, and referring to 1106 in the context of FIG. 7, the relay device 706 may relay the data/control information 744 between the base station 702 and the UE 704 on the access link 712 based on the beamforming configuration information 740.

In some examples, and referring to 1106 in the context of FIG. 8, the relay device 806 may relay the data/control information 856 between the base station 802 and the UE 804 on the access link 812 based on the beamforming configuration information 852.

Figure 12:
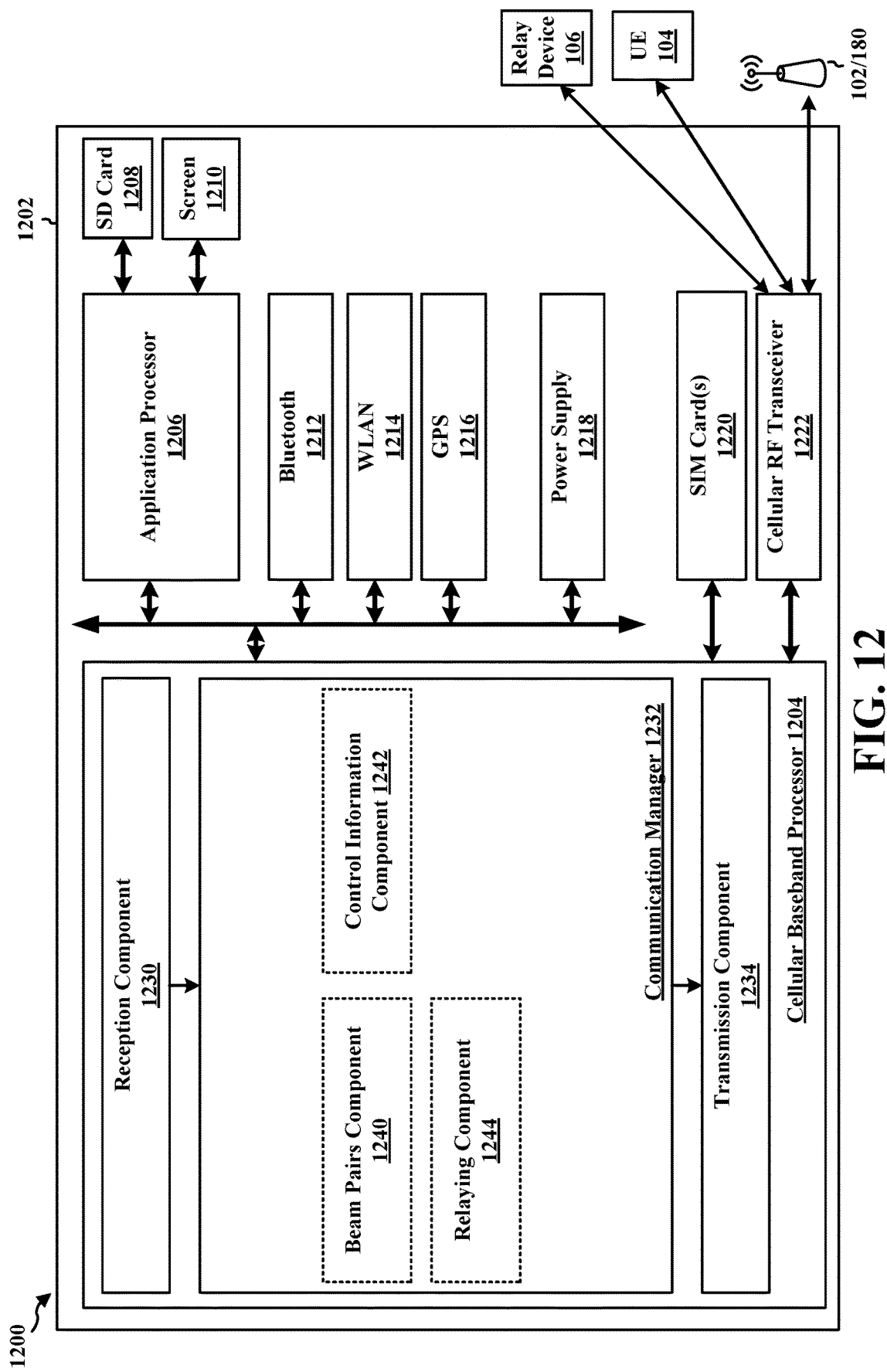
FIG. 12 is a diagram illustrating an example of a hardware implementation for an example apparatus, in accordance with the teachings disclosed herein.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the cellular baseband processor 1204, and in another configuration, the apparatus 1202 may be the entire UE (e.g., see the UE 350 of FIG. 3) and include the aforediscussed additional modules of the apparatus 1202.

The communication manager 1232 includes a beam pairs component 1240 is configured to receive information indicating a subset of a set of beam pairs based on a first set of measurements associated with the set of beam pairs, e.g., as described in connection with 1102 of FIG. 11. The communication manager 1232 further includes a control information component 1242 that is configured to receive first control information on the wireless backhaul link from the first wireless device, e.g., as described in connection with 1104 of FIG. 11. The communication manager 1232 further includes a relaying component 1244 that is configured to relay at least one of data or second control information between the first wireless device on the first relay access link portion and the at least one second wireless device on the second relay access link portion, e.g., as described in connection with 1106 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for receiving, from a first wireless device, information indicating a subset of a set of beam pairs based on a first set of measurements associated with the set of beam pairs, where the subset of beam pairs is associated with at least one of a wireless backhaul link between the first wireless device and the relay device, a first relay access link portion between the first wireless device and the relay device, or a second relay access link portion between the relay device and at least one second wireless device. The example apparatus 1202 may also include means for receiving first control information on a wireless backhaul link from the first wireless device. The example apparatus 1202 may also include means for relaying at least one of data or second control information between the first wireless device on the first relay access link portion and the at least one second wireless device on the second relay access link portion, and where at least one of the receiving of the first control information or the relaying of the at least one of data or second control information is based on the subset of beam pairs. The example apparatus 1202 may also include means for receiving, from the first wireless device, information indicating the set of bandwidth parts for the first control information, and where each of the set of bandwidth parts is active for the first control information at the respective interval of the set of intervals. The example apparatus 1202 may also include means for transmitting a set of reference signals to the first wireless device for measurement of each of the first set of measurements by the first wireless device. The example apparatus 1202 may also include means for receiving a set of reference signals from the first wireless device. The example apparatus 1202 may also include means for measuring each of the first set of measurements based on the received set of reference signals. The example apparatus 1202 may also include means for transmitting the first set of measurements to the first wireless device. The example apparatus 1202 may also include means for relaying a set of reference signals between the first wireless device and the at least one second wireless device, where the first set of measurements is based on the set of reference signals, and where the subset of beam pairs comprises a first beam pair associated with the first relay access link portion and a second beam pair associated with the second relay access link portion.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teachings described herein, without limitation.

Example 1 is a method of wireless communication by a control node, the method comprising: determining a first set of measurements associated with at least one set of beam pairs, wherein the at least one set of beam pairs is associated with at least one of a wireless backhaul link between a first wireless device and a relay device, a first relay access link portion between the first wireless device and the relay device, or a second relay access link portion between the relay device and at least one second wireless device; configuring at least one subset of beam pairs of the at least one set of beam pairs based on the first set of measurements; and transmitting information indicating the at least one subset of beam pairs to the relay device.

In Example 2, the method of Example 1 further includes that the first wireless device comprises the control node, and the method further comprising communicating, with the relay device, first control information for the relay device and at least one of data or second control information for the at least one second wireless device to be relayed by the relay device.

In Example 3, the method of any of Example 1 or Example 2 further includes that each of the first set of measurements is associated with a respective one of a set of bandwidth parts of an available system bandwidth, and wherein each of the set of bandwidth parts are associated with the first control information for the relay device at a corresponding interval of a set of intervals.

In Example 4, the method of any of Examples 1 to 3 further includes: configuring the set of bandwidth parts for the first control information, wherein each of the set of bandwidth parts is active for the first control information at the respective interval of the set of intervals.

In Example 5, the method of any of Examples 1 to 4 further includes that determining the first set of measurements associated with the at least one set of beam pairs comprises one of: receiving the first set of measurements from the relay device based on a first set of reference signals transmitted to the relay device, or measuring each of the first set of measurements based on a second set of reference signals received from the relay device.

In Example 6, the method of any of Examples 1 to 5 further includes that configuring the at least one subset of beams pairs based on the first set of measurements comprises: configuring a first subset of the set of beam pairs for the wireless backhaul link based on the first set of measurements, wherein each of the first subset of the set of beam pairs is associated with a respective one of the set of bandwidth parts at the corresponding interval of the set of intervals.

In Example 7, the method of any of Examples 1 to 6 further includes: configuring a second subset of the set of beam pairs for the first relay access link portion based on the first set of measurements, wherein each of the second subset of the set of beam pairs is to be used for the at least one of data or second control information carried on a wideband of the available system bandwidth excluding the respective one of the set of bandwidth parts at the corresponding interval of the set of intervals.

In Example 8, the method of any of Examples 1 to 7 further includes that determining the first set of measurements associated with the at least one set of beam pairs comprises one of: receiving the first set of measurements from the at least one second wireless device based on a first set of reference signals relayed to the at least one second wireless device by the relay device, or measuring each of the first set of measurements based on a second set of reference signals relayed from the at least one second wireless device by the relay device.

In Example 9, the method of any of Examples 1 to 8 further includes that configuring the at least one subset of beams pairs based on the first set of measurements comprises at least one of: configuring a first beam pair of the at least one subset of beam pairs for the wireless backhaul link between the first wireless device and the relay device, configuring a second beam pair of the at least one subset of beam pairs for the first relay access link portion between the first wireless device and the relay device, or configuring a third beam pair of the at least one subset of beam pairs for the second relay access link portion between the relay device and the at least one second wireless device.

Example 10 is a device including one or more processors and one or more memories in electronic communication with the one or more processors storing instructions executable by the one or more processors to cause a system or an apparatus to implement a method as in any of Examples 1 to 9.

Example 11 is a system or apparatus including means for implementing a method or realizing an apparatus as in any of Examples 1 to 9.

Example 12 is a non-transitory computer-readable medium storing instructions executable by one or more processors to cause the one or more processors to implement a method as in any of Examples 1 to 9.

Example 13 is a method of wireless communication by a relay device, the method comprising: receiving, from a first wireless device, information indicating a subset of a set of beam pairs based on a first set of measurements associated with the set of beam pairs, wherein the subset of beam pairs is associated with at least one of a wireless backhaul link between the first wireless device and the relay device, a first relay access link portion between the first wireless device and the relay device, or a second relay access link portion between the relay device and at least one second wireless device; receiving first control information on a wireless backhaul link from the first wireless device; and relaying at least one of data or second control information between the first wireless device on the first relay access link portion and the at least one second wireless device on the second relay access link portion, wherein at least one of the receiving of the first control information or the relaying of the at least one of data or second control information is based on the subset of beam pairs.

In Example 14, the method of Example 13 further includes that each of the first set of measurements is associated with a respective one of a set of bandwidth parts of an available system bandwidth, and wherein each of the set of bandwidth parts are associated with the first control information on the wireless backhaul link at a corresponding interval of a set of intervals.

In Example 15, the method of any of Example 13 or Example 14 further includes:
receiving, from the first wireless device, information indicating the set of bandwidth parts for the first control information, wherein each of the set of bandwidth parts is active for the first control information at the respective interval of the set of intervals.

In Example 16, the method of any of Examples 13 to 15 further includes: transmitting a set of reference signals to the first wireless device for measurement of each of the first set of measurements by the first wireless device.

In Example 17, the method of any of Examples 13 to 16 further includes: receiving a set of reference signals from the first wireless device; measuring each of the first set of measurements based on the received set of reference signals; and transmitting the first set of measurements to the first wireless device.

In Example 18, the method of any of Examples 13 to 17 further includes that the information indicating the subset of beam pairs comprises a first subset of beam pairs for the wireless backhaul link, wherein each of the first subset of beam pairs is associated with a respective one of the set of bandwidth parts at the corresponding interval of the set of intervals.

In Example 19, the method of any of Examples 13 to 18 further includes that the information indicating the subset of beam pairs comprises a second subset of beam pairs for the first relay access link portion, wherein each of the second subset of the set of beam pairs is to be used for the at least one of data or second control information carried on a wideband of the available system bandwidth excluding the respective one of the set of bandwidth parts at the corresponding interval of the set of intervals.

In Example 20, the method of any of Examples 13 to 19 further includes: relaying a set of reference signals between the first wireless device and the at least one second wireless device, wherein the first set of measurements is based on the set of reference signals, and wherein the subset of beam pairs comprises a first beam pair associated with the first relay access link portion and a second beam pair associated with the second relay access link portion.

In Example 21, the method of any of Examples 13 to 20 further includes that the first set of measurements is based on a set of reference signals received from the first wireless device, and wherein the subset of beam pairs comprises a first beam pair associated with downlink communication on the wireless backhaul link.

In Example 22, the method of any of Examples 13 to 21 further includes that the first set of measurements is based on a set of reference signals transmitted to the first wireless device, and wherein the subset of beam pairs comprises a first beam pair associated with uplink communication on the wireless backhaul link.

Example 23 is a device including one or more processors and one or more memories in electronic communication with the one or more processors storing instructions executable by the one or more processors to cause a system or an apparatus to implement a method as in any of Examples 13 to 22.

Example 24 is a system or apparatus including means for implementing a method or realizing an apparatus as in any of Examples 13 to 22.

Example 25 is a non-transitory computer-readable medium storing instructions executable by one or more processors to cause the one or more processors to implement a method as in any of Examples 13 to 22.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a control node, the method comprising:
    determining a first set of measurements associated with at least one set of beam pairs to provide first control information in a bandwidth part (BWP) to a relay device and to communicate at least one of data or second control information for at least one second wireless device to be relayed by the relay device over a wider frequency bandwidth than the BWP, wherein the at least one set of beam pairs includes at least a first transmit beam and a first receive beam to facilitate communication via at least one of a wireless backhaul link between a first wireless device and the relay device, a first relay access link portion between the first wireless device and the relay device, or a second relay access link portion between the relay device and the at least one second wireless device;
    configuring at least one subset of beam pairs of the at least one set of beam pairs based on the first set of measurements, measured in part by the control node, associated with the at least one set of beam pairs; and
    transmitting information indicating the at least one subset of beam pairs to the relay device.

2. The method of claim 1, wherein the first wireless device comprises the control node, the method further comprising:
    communicating, with the relay device, the first control information for the relay device and the at least one of the data or the second control information for the at least one second wireless device to be relayed by the relay device.

3. The method of claim 2, wherein determining the first set of measurements includes determining each measurement associated with a respective bandwidth part of a set of bandwidth parts available for the first control information in an available system bandwidth that corresponds to the wider frequency bandwidth for the at least one of the data or the second control information,
    wherein each bandwidth part of the set of bandwidth parts is associated with the first control information for the relay device at a corresponding interval of a set of intervals.

4. The method of claim 3, further comprising:
    configuring the set of bandwidth parts for the first control information,
    wherein each bandwidth part of the set of bandwidth parts is active for the first control information at respective intervals of the set of intervals.

5. The method of claim 3, wherein determining the first set of measurements associated with the at least one set of beam pairs comprises one of:
    receiving the first set of measurements from the relay device based on a first set of reference signals transmitted to the relay device, or
    measuring each measurement of the first set of measurements based on a second set of reference signals received from the relay device.

6. The method of claim 3, wherein configuring the at least one subset of beam pairs based on the first set of measurements comprises:

configuring a first subset of the at least one set of beam pairs for the wireless backhaul link based on the first set of measurements, wherein each beam pair of the first subset of the at least one set of beam pairs is associated with respective bandwidth parts of the set of bandwidth parts at the corresponding interval of the set of intervals.

7. The method of claim 6, further comprising:
configuring a second subset of beam pairs of the at least one set of beam pairs for the first relay access link portion based on the first set of measurements, wherein each beam pair of the second subset of beam pairs is associated with at least one of the data or the second control information carried on a wideband of the available system bandwidth excluding the respective bandwidth part of the set of bandwidth parts at the corresponding interval of the set of intervals.

8. The method of claim 2, wherein determining the first set of measurements associated with the at least one set of beam pairs comprises one of:

receiving the first set of measurements from the at least one second wireless device based on a first set of reference signals relayed to the at least one second wireless device by the relay device, or measuring each measurement of the first set of measurements based on a second set of reference signals relayed from the at least one second wireless device by the relay device.

9. The method of claim 8, wherein configuring the at least one subset of beam pairs based on the first set of measurements comprises at least one of:

configuring a first beam pair of the at least one subset of beam pairs for the wireless backhaul link between the first wireless device and the relay device, configuring a second beam pair of the at least one subset of beam pairs for the first relay access link portion between the first wireless device and the relay device, or configuring a third beam pair of the at least one subset of beam pairs for the second relay access link portion between the relay device and the at least one second wireless device.

10. An apparatus for wireless communication at a control node, comprising:
a memory; and
at least one processor coupled to the memory and configured to:
determine a first set of measurements associated with at least one set of beam pairs to provide first control information in a bandwidth part (BWP) to a relay device and to communicate at least one of data or second control information for at least one second wireless device to be relayed by the relay device over a wider frequency bandwidth than the BWP, wherein the at least one set of beam pairs includes at least a first transmit beam and a first receive beam to facilitate communication via at least one of a wireless backhaul link between a first wireless device and the relay device, a first relay access link portion between the first wireless device and the relay device, or a second relay access link portion between the relay device and the least one second wireless device;
configure at least one subset of beam pairs of the at least one set of beam pairs based on the first set of measurements, measured in part by the control node, associated with the at least one set of beam pairs; and
transmit information indicating the at least one subset of beam pairs to the relay device.

11. The apparatus of claim 10, wherein the first wireless device comprises the control node, and the at least one processor is further configured to:
communicate, with the relay device, the first control information for the relay device and the at least one of the data or the second control information for the at least one second wireless device to be relayed by the relay device.

12. The apparatus of claim 11, wherein to determine the first set of measurements includes a determination that each measurement associated with a respective bandwidth part of a set of bandwidth parts available for the first control information in an available system bandwidth that corresponds to the wider frequency bandwidth for the at least one of the data or the second control information, wherein each bandwidth part of the set of bandwidth parts is associated with the first control information for the relay device at a corresponding interval of a set of intervals.

13. The apparatus of claim 12, wherein the at least one processor is further configured to:
configure the set of bandwidth parts for the first control information, wherein each bandwidth part of the set of bandwidth parts is active for the first control information at respective intervals of the set of intervals.

14. The apparatus of claim 12, wherein to determine the first set of measurements associated with the at least one set of beam pairs, the at least one processor is configured to one of:

receive the first set of measurements from the relay device based on a first set of reference signals transmitted to the relay device, or measure each measurement of the first set of measurements based on a second set of reference signals received from the relay device.

15. The apparatus of claim 12, wherein to configure the at least one subset of beam pairs based on the first set of measurements, the at least one processor is configured to:
configure a first subset of the at least one set of beam pairs for the wireless backhaul link based on the first set of measurements, wherein each beam pair of the first subset of the at least one set of beam pairs is associated with respective bandwidth parts of the set of bandwidth parts at the corresponding interval of the set of intervals.

16. The apparatus of claim 15, wherein the at least one processor is further configured to:
configure a second subset of beam pairs of the at least one set of beam pairs for the first relay access link portion based on the first set of measurements, wherein each beam pair of the second subset of beam pairs is associated with at least one of the data or the second control information carried on a wideband of the available system bandwidth excluding the respective bandwidth part of the set of bandwidth parts at the corresponding interval of the set of intervals.

17. The apparatus of claim 11, wherein to determine the first set of measurements associated with the at least one set of beam pairs, the at least one processor is configured to one of:

receive the first set of measurements from the at least one second wireless device based on a first set of reference signals relayed to the at least one second wireless device by the relay device, or measure each measurement of the first set of measurements based on a second set of reference signals relayed from the at least one second wireless device by the relay device.

18. The apparatus of claim 17, wherein to configure the at least one subset of beam pairs based on the first set of measurements, the at least one processor is configured to at least one of:
configure a first beam pair of the at least one subset of beam pairs for the wireless backhaul link between the first wireless device and the relay device,
configure a second beam pair of the at least one subset of beam pairs for the first relay access link portion between the first wireless device and the relay device, or
configure a third beam pair of the at least one subset of beam pairs for the second relay access link portion between the relay device and the at least one second wireless device.

19. A method of wireless communication by a relay device, the method comprising:
receiving, from a first wireless device, information indicating a subset of beam pairs of a set of beam pairs based on a first set of measurements, measured in part by the first wireless device, associated with the set of beam pairs that provides first control information in a bandwidth part (BWP) and communicates at least one of data or second control information for at least one second wireless device to be relayed by the relay device over a wider frequency bandwidth than the BWP, wherein the subset of beam pairs includes at least a first transmit beam and a first receive beam to facilitate communication via at least one of a wireless backhaul link between the first wireless device and the relay device, a first relay access link portion between the first wireless device and the relay device, or a second relay access link portion between the relay device and the at least one second wireless device;
receiving the first control information on the wireless backhaul link from the first wireless device; and
relaying the at least one of the data or the second control information between the first wireless device on the first relay access link portion and the at least one second wireless device on the second relay access link portion,
wherein at least one of receiving the first control information or relaying at least one of the data or the second control information is based on the subset of beam pairs.

20. The method of claim 19, wherein the first set of measurements includes a determination that each measurement is associated with a respective bandwidth part of a set of bandwidth parts available for the first control information in an available system bandwidth that corresponds to the wider frequency bandwidth for the at least one of the data or the second control information,
wherein each bandwidth part of the set of bandwidth parts is associated with the first control information on the wireless backhaul link at a corresponding interval of a set of intervals.

21. The method of claim 20, further comprising:
receiving, from the first wireless device, second information indicating the set of bandwidth parts for the first control information,
wherein each bandwidth part of the set of bandwidth parts is active for the first control information at respective intervals of the set of intervals.

22. The method of claim 20, further comprising:
transmitting a set of reference signals to the first wireless device to facilitate measurement of each measurement of the first set of measurements by the first wireless device.

23. The method of claim 20, further comprising:
receiving a set of reference signals from the first wireless device;
measuring each measurement of the first set of measurements based on the set of reference signals; and
transmitting the first set of measurements to the first wireless device.

24. The method of claim 20, wherein the information indicating the subset of beam pairs comprises a first subset of beam pairs for the wireless backhaul link,
wherein each beam pair of the first subset of beam pairs is associated with respective bandwidth parts of the set of bandwidth parts at the corresponding interval of the set of intervals.

25. The method of claim 24, wherein the information indicating the subset of beam pairs comprises a second subset of beam pairs for the first relay access link portion,
wherein each beam pair of the second subset of beam pairs is associated with at least one of the data or the second control information carried on a wideband of the available system bandwidth excluding the respective bandwidth part of the set of bandwidth parts at the corresponding interval of the set of intervals.

26. The method of claim 19, further comprising:
relaying a set of reference signals between the first wireless device and the at least one second wireless device, and
wherein the first set of measurements is based on the set of reference signals,
wherein the subset of beam pairs comprises a first beam pair associated with the first relay access link portion and a second beam pair associated with the second relay access link portion.

27. The method of claim 19, wherein the first set of measurements is based on a set of reference signals received from the first wireless device, and wherein the subset of beam pairs comprises a first beam pair associated with downlink communication on the wireless backhaul link.

28. The method of claim 19, wherein the first set of measurements is based on a set of reference signals transmitted to the first wireless device, and wherein the subset of beam pairs comprises a first beam pair associated with uplink communication on the wireless backhaul link.

29. An apparatus for wireless communication at a relay device, comprising:
a memory; and
at least one processor coupled to the memory and configured to:
receive, from a first wireless device, information indicating a subset of beam pairs of a set of beam pairs based on a first set of measurements, measured in part by the first wireless device, associated with the set of beam pairs that provides first control information in a bandwidth part (BWP) and communicates at least one of data or second control information for at least one second wireless device to be relayed by the relay device over a wider frequency bandwidth than the BWP, wherein the subset of beam pairs includes at least a first transmit beam and a first receive beam to facilitate communication via at least one of a wireless backhaul link between the first wireless device and the relay device, a first relay access link portion between the first wireless device and the relay device, or a second relay access link portion between the relay device and the at least one second wireless device;

receive the first control information on the wireless backhaul link from the first wireless device; and relay the at least one of the data or the second control information between the first wireless device on the first relay access link portion and the at least one second wireless device on the second relay access link portion, wherein at least one of receiving the first control information or relaying at least one of the data or the second control information is based on the subset of beam pairs.

30. The apparatus of claim 29, wherein the first set of measurements includes a determination that each measurement is associated with a respective bandwidth part of a set of bandwidth parts available for the first control information in an available system bandwidth that corresponds to the wider frequency bandwidth for the at least one of the data or the second control information, wherein each bandwidth part of the set of bandwidth parts is associated with the first control information on the wireless backhaul link at a corresponding interval of a set of intervals.

* * * * *